United States Patent
Kato et al.

(10) Patent No.: US 6,536,890 B1
(45) Date of Patent: Mar. 25, 2003

(54) LIQUID COMPOSITION AS WELL AS INK SET, IMAGE FORMING METHOD, IMAGE FORMING APPARATUS AND BLEED ALLEVIATION METHOD USING THE SAME

(75) Inventors: Masao Kato, Utsunomiya (JP); Yutaka Kurabayashi, Higashimurayama (JP); Kentaro Yano, Yokohama (JP); Yuji Kondo, Machida (JP); Hiroshi Tomioka, Tokyo (JP); Mitsuhiro Ono, Yokohama (JP); Makiko Endo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/708,574

(22) Filed: Nov. 9, 2000

(30) Foreign Application Priority Data

Nov. 12, 1999 (JP) ............................................ 11-323411
Nov. 12, 1999 (JP) ............................................ 11-323426
Oct. 26, 2000 (JP) ........................................ 2000-327592

(51) Int. Cl.⁷ .................................................. B41J 2/05
(52) U.S. Cl. .......................................... 347/100; 347/96
(58) Field of Search ........................... 347/100, 96, 101

(56) References Cited

U.S. PATENT DOCUMENTS

| | | | |
|---|---|---|---|
| 4,202,870 A | 5/1980 | Weber et al. | 423/630 |
| 4,242,271 A | 12/1980 | Weber et al. | 260/448 |
| 4,694,302 A | 9/1987 | Hackleman et al. | 346/1.1 |
| 4,723,129 A | 2/1988 | Endo et al. | 346/1.1 |
| 5,549,740 A * | 8/1996 | Takahashi et al. | 347/100 |
| 5,614,007 A | 3/1997 | Kurabayashi et al. | 106/22 R |
| 5,618,338 A | 4/1997 | Kurabayashi et al. | 106/26 R |
| 5,623,294 A | 4/1997 | Takizawa et al. | 347/98 |
| 5,624,484 A | 4/1997 | Takashi et al. | 106/31.75 |
| 5,640,187 A | 6/1997 | Kashiwazaki et al. | 347/101 |
| 5,700,314 A | 12/1997 | Kurabayashi et al. | 106/31.27 |
| 5,792,249 A | 8/1998 | Shirota et al. | 106/31.27 |
| 5,835,116 A | 11/1998 | Sato et al. | 347/98 |
| 5,985,975 A | 11/1999 | Kurabayashi et al. | 524/462 |
| 6,027,210 A | 2/2000 | Kurabayashi et al. | 347/100 |
| 6,074,052 A | 6/2000 | Inui et al. | 347/101 |
| 6,238,045 B1 | 5/2001 | Ono et al. | 347/96 |
| 6,322,183 B1 * | 11/2001 | Kubota et al. | |

FOREIGN PATENT DOCUMENTS

| | | | | |
|---|---|---|---|---|
| EP | 0726158 | * | 8/1996 | ............. B41J/2/21 |
| JP | 61-59911 B2 | | 5/1979 | |
| JP | 61-59912 B2 | | 5/1979 | |
| JP | 61-59914 B2 | | 2/1980 | |
| JP | 55-65269 | | 5/1980 | |
| JP | 55-66976 | | 5/1980 | |
| JP | 55-150396 | | 11/1980 | |
| JP | 63-22681 | | 1/1988 | |
| JP | 63-60783 | | 3/1988 | |
| JP | 63-299971 | | 12/1988 | |
| JP | 64-9279 | | 1/1989 | |
| JP | 64-63185 | | 3/1989 | |
| JP | 4-259590 | | 9/1992 | |
| JP | 6-92010 | | 4/1994 | |
| JP | 8-72393 | | 3/1996 | |
| JP | 8-224955 | | 9/1996 | |

* cited by examiner

Primary Examiner—John Barlow
Assistant Examiner—Manish S. Shah
(74) Attorney, Agent, or Firm—Fitzpatrick, Cella, Harper & Scinto

(57) ABSTRACT

A liquid composition is adapted for use with an anionic ink for forming a high quality image with alleviated bleeding by means of an ink-jet recording system. The liquid composition includes a first cationic substance and a second cationic substance different from said first cationic substance, of which the first cationic substance is provided in the form of micro-particles at least whose surface is cationic.

41 Claims, 8 Drawing Sheets

FIG. 10A
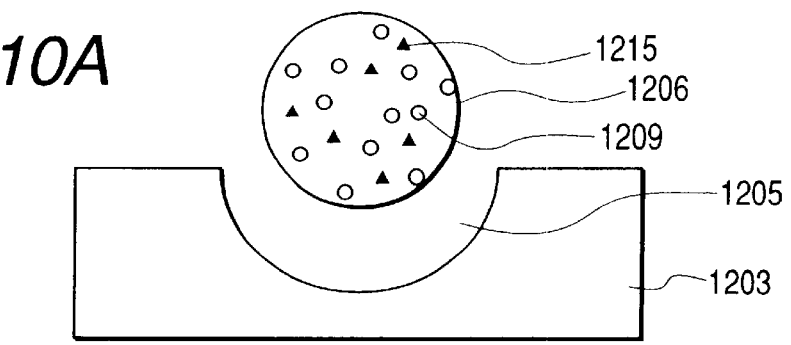
FIG. 10B
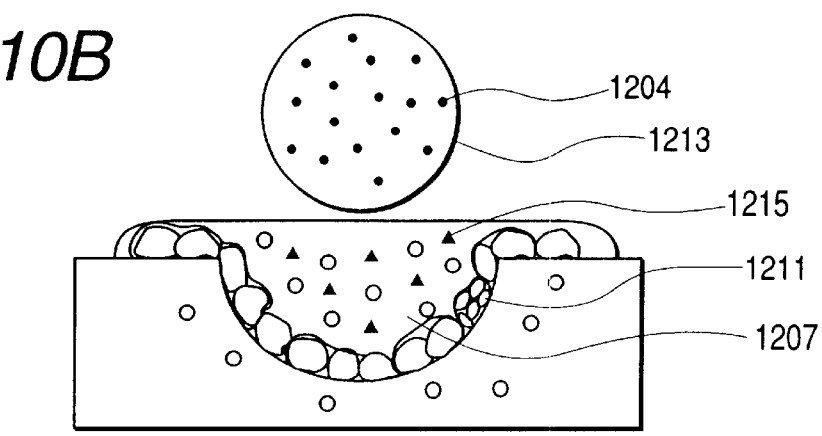
FIG. 10C
FIG. 10CA
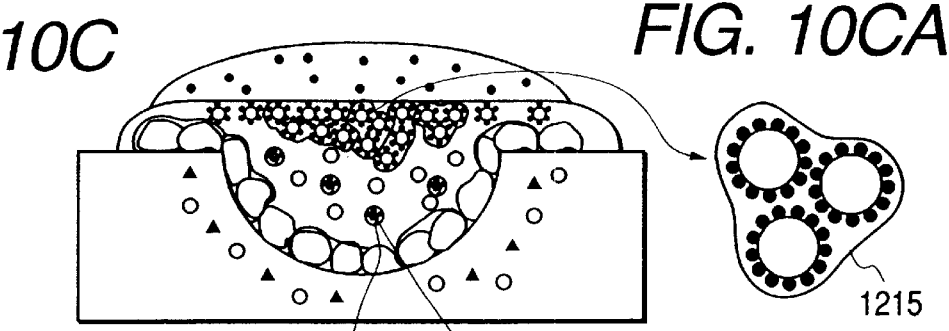
FIG. 10CB
FIG. 10D
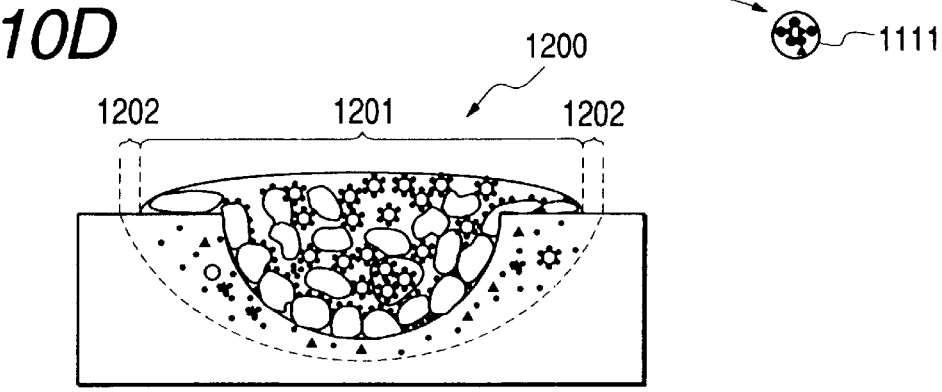

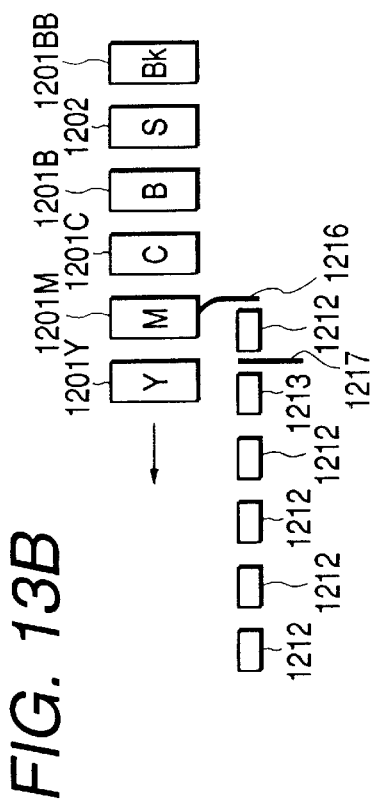
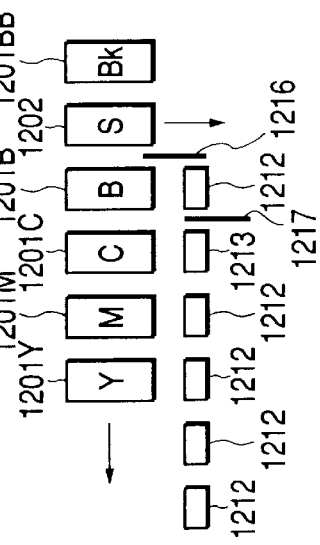
FIG. 13A  FIG. 13B  FIG. 13C  FIG. 13D  FIG. 13E  FIG. 13F

LIQUID COMPOSITION AS WELL AS INK SET, IMAGE FORMING METHOD, IMAGE FORMING APPARATUS AND BLEED ALLEVIATION METHOD USING THE SAME

BACKGROUND OF THE INVENTION

1. Field of the Invention

This invention generally relates to the technology of forming color images excellent in terms of coloring property and color evenness. More particularly, the present invention relates to a liquid composition optimally applicable to image forming processes using an ink-jet recording method as well as to an ink set, an image forming method and an image forming apparatus using such a liquid composition.

2. Related Background Art

With the ink-jet recording method, ink is made to fly and stick to a recording medium such as a sheet of paper for recording. Japanese Patent Publications Nos. 61-59911, 61-59912 and 61-59914 disclose an ink-jet recording method using an electrothermal transducer as ejection energy supply means to provide ink with thermal energy and generate a bubble there so as to make it possible to eject liquid droplets. The disclosed method provides an advantage that it allows the use of a high density multi-orifice recording head so that a high resolution and high definition image can be recorded at high speed.

Meanwhile, ink to be used with the known ink-jet recording method contains water as principal ingredient along with a water-soluble high boiling point solvent such as glycol added thereto for the purpose of preventing ink from drying in the nozzle and clogging the latter. Such ink is short of being positionally fixed satisfactorily on the recording medium and can produce an uneven image probably because of the uneven distribution of the filler and the sizing agent on the surface of the recording medium, which is typically a sheet of paper. On the other hand, there has arisen a strong demand for high quality ink-jet recording comparable to the quality level of silver salt photography. Thus, currently there is a strong technological demand for raising the optical density of images formed by ink-jet recording, broadening the spectrum of color reproducibility of ink-jet recording and improving the color evenness of recorded images.

Under these circumstances, various techniques have been proposed to enhance the stability of ink-jet recording and improve the quality of images formed by ink-jet recording. According to certain techniques proposed for recording medium, a filler and a sizing agent are applied to the surface of the base paper of recording medium. For example, porous micro-particles adapted to adsorb coloring materials are applied to the base paper to form an ink receiving layer of porous micro-particles on it. Coat paper (certain types of coated paper) for ink-jet recording is currently marketed as recording medium realized on the basis of such techniques.

As for techniques concerning recording liquid that is to be ejected on the recording medium in the form of a jet stream, there is one proposed for applying ink and a processing solution chemically sensitive to ink onto the recording medium in such a way that they react with each other on the recording medium. Ink-jet printers that utilizes this technique have also been marketed.

For instance, Japanese Patent Application Laid-Open No. 63-60783 discloses a recording method of causing a liquid composition containing a basic polymer to adhere to a recording medium and subsequently recording an image by using inks containing an anionic dye and Japanese Patent Application Laid-Open No. 63-22681 discloses a recording method of mixing a first liquid composition containing reactive chemical species and a second liquid composition containing compounds that react with the reactive chemical species on a recording medium. Furthermore, Japanese Patent Application Laid-Open No. 63-299971 discloses a recording method of applying a liquid composition containing an organic compound having two or more than two cationic radicals per molecule onto a recording medium and subsequently recording an image by using ink containing an anionic dye and Japanese Patent Application Laid-Open No. 64-9279 discloses a recording method of applying an acidic liquid composition containing succinic acid and subsequently recording an image by using ink containing an anionic dye. Japanese Patent Application Laid-Open No. 64-63185 discloses a recording method of applying a liquid composition that makes dyes insoluble before recording an image by using ink.

Additionally, Japanese Patent Application Laid-Open No. 8-224955 discloses a recording method of using a liquid composition containing a first cationic substance showing a different molecular weight distribution range and ink containing an anionic coloring material and Japanese Patent Application Laid-Open No. 8-72393 discloses a liquid composition containing a cationic substrate and finely divided cellulose with ink. These patent documents suggest that they can produce excellent images in terms of high optical density, printing quality and water-resistance as well as color reproducibility and bleeding. Japanese Patent Application Laid-Open No. 55-150396 proposes a recording method of recording an image on a recording medium by means of a dye ink and subsequently applying a water-proofing agent adapted to form a lake there as means for making the recorded image water-resistant.

On the other hand, there has been recognized a problem called bleeding, which is a phenomenon occurring when a plurality of inks of different colors are applied adjacent to each other onto a recording medium for forming a multi-color image and can blur the image by the mixing of inks with each other at the boundary areas of the image.

To avoid the problem, proposals have been made for accelerating the fixing process of ink on the recording medium (such as recording paper). Japanese Patent Application Laid-Open No. 55-65269 discloses a method of adding a compound for improving the permeability of ink such as a surface active agent to ink and Japanese Patent Application Laid-Open No. 55-66976 discloses the use of ink containing a volatile solvent as principal ingredient. However, while the former method of adding a surface active agent to ink may improve the permeability of ink relative to the recording medium to make the ink advantageous in terms of fixation or bleeding, the coloring materials in the ink can also permeate deep into the recording medium to disadvantageously reduce the optical density and the saturation of the image formed on the recording medium.

SUMMARY OF THE INVENTION

The recording medium obtained by applying a filler and a sizing agent to the surface of base paper (hereinafter referred to as coated paper) has been recognized as a technological achievement for forming high quality images.

It is known that the coloring material applied to the surface of a recording medium generally has to be made to remain in an isolated molecular state without being coagulated on the surface in order to obtain a highly saturated image. The porous micro-particles of coat paper operates to show such a functional feature. However, in order to obtain a satisfactory level of optical density and saturation for the image formed thereon, a thick ink receiving layer has to be formed on the surface of base paper by applying porous micro-particles at an enhanced rate to completely cover the base paper so that, as a result, the texture of the base paper can be lost. To begin with, the inventors of the present invention presumed that such a thick ink receiving layer is needed at the cost of the texture of the base paper because the coloring material is not adsorbed by the porous micro-particles effectively and efficiently.

The following description is based on an assumption of using coat paper having a single ink receiving layer. FIG. 9 of the accompanying drawings is a schematic cross sectional view of a type of coat paper, showing only a part of the surface thereof. Referring to FIG. 9, there are shown base paper 901 and an ink receiving layer 903. Generally, the ink receiving layer contains porous micro-particles 905 and an adhesive agent 907 for rigidly holding them. As ink is applied to the surface, it permeates to fill the gaps among the porous micro-particles 905 due to the capillarity of the gaps to form permeating ink sections 909. Since the ink receiving layer shows a locally varying density of porous micro-particles as shown in FIG. 9, ink may permeate in various different ways although it does due to the capillarity of the gaps. Therefore, the coloring material contained in the ink may not be able to contact evenly to the surfaces of the porous micro-particles so that they may not be adsorbed effectively and efficiently by the porous micro-particles.

Additionally, there may arise areas where ink is prevented from permeating by the adhesive agent 907 so that there may be areas in the ink receiving layer 903 where ink cannot get into. Such areas do not operate at all for coloring. For the above reasons, porous micro-particles cannot effectively and efficiently adsorb coloring materials in an isolated molecular state on conventional coat paper so that they have to be applied at an enhanced rate at the cost of the texture of the coat paper.

On the basis of the above novel finding, the inventors of the present invention came to find that it is possible to cause coloring materials and micro-particles to react each other in a liquid-liquid state by using micro-particles adapted to adsorb the coloring materials and dispersing the micro-particles in a liquid phase so that both the coloring materials and the micro-particles may be present in a liquid state, whereby images improved in optical density and saturation can be formed.

In view of the above described technological background, the inventors of the present invention came to select the following objectives.

(1) Since it is important to make the given ink and coloring material operate more effectively and efficiently for the improvement of the optical density and the saturation. Therefore, it is an object of the present invention to provide an ink set that can form an image with a high optical density and a high degree of saturation by ink-jet recording.

(2) It is also an object of the present invention to provide an ink set that can alleviate the problem of bleeding appearing along the boundary areas of a multi-color image formed by applying a plurality of inks of different colors where different colors of the image contact with each other.

It is still another object of the present invention to provide an ink-jet recording method that can form a high quality multi-color image showing a high degree of optical density and saturation on a recording medium by means of ink-jet without damaging the texture of the recording medium and without being accompanied by the problem of recognizable bleeding appearing along the boundary areas of the multi-color image.

Still another object of the present invention is to provide an ink-jet recording apparatus that can form a high quality multi-color image on a recording medium by means of ink-jet without being accompanied by the problem of recognizable bleeding appearing along the boundary areas of the multi-color image and also a recording unit and an ink cartridge to be used with such an ink-jet recording apparatus. A further object of the present invention is to provide a method of alleviating the problem of bleeding of an image showing a high degree of optical density and saturation and formed by means of an ink-jet recording method.

In an aspect of the present invention, the above objects are achieved by providing a liquid composition containing a first cationic substance and a second cationic substance different from the first cationic substance, the first cationic substance being in the form of micro-particles, the micro-particles being cationic at least at the surface thereof.

In another aspect of the present invention, there is provided a liquid composition to be used with an anionic aqueous ink containing a coloring material so as to react with the ink on a recording medium for printing on the recording medium, the liquid composition containing a first cationic substance and a second cationic substance different from the first cationic substance, the first cationic substance being in the form of micro-particles, the micro-particles being cationic at least at the surface thereof.

In still another aspect of the present invention, there is provided an ink set comprising in combination a liquid composition according to the invention and at least an anionic ink selected from a group of inks of yellow, magenta, cyan, black, red, blue and green.

In still another aspect of the present invention, there is provided an image forming method comprising a step of applying a liquid composition according to the invention and an ink containing an anionic coloring material to a recording medium so as to make them contact with each other on the recording medium.

In still another aspect of the present invention, there is provided an image recording apparatus provided with a recording unit comprising an ink storage section for storing separately a liquid composition according to the invention and an ink of at least one color containing an anionic substance and a head section for separately ejecting the liquid composition and the ink as liquid droplets.

In still another aspect of the present invention, there is provided a liquid composition adapted to form colored sections on a recording medium when applied to the recording medium with an ink containing an anionic or cationic coloring material:

the liquid composition containing a first compound showing the polarity opposite to that of the ink and a second compound also showing the polarity opposite to that of the ink;

the first compound being in the form of micro-particles;

the coloring material in the ink being adapted to be adsorbed or bound to the surface of the micro-particles while its molecular state being substantially equivalent to that in the ink at the time of mixing the liquid composition and the ink in a liquid state so as to make the dispersion of the micro-particles unstable and the micro-particles coagulate with each other.

In still another aspect of the present invention, there is provided an ink set comprising as independent components thereof an ink containing an anionic or cationic coloring material and a liquid composition containing micro-particles electrically charged to the polarity opposite to that of the coloring material;

the liquid composition containing a first compound showing the polarity opposite to that of the ink and a second compound also showing the polarity opposite to that of the ink;

the coloring material in the ink being adapted to be adsorbed or bound to the surface of the micro-particles while its molecular state being substantially equivalent to that in the ink at the time of mixing the liquid composition and the ink in a liquid state so as to make the dispersion of the micro-particles unstable and the micro-particles coagulate with each other.

In still another aspect of the present invention, there is provided an image forming method comprising a step of causing an ink containing a coloring material and a liquid composition containing a first compound in the form of micro-particles reactive to the coloring material and a second compound also reactive to the coloring material to react with each other as liquid-liquid reaction on a recording medium and forming colored sections containing the coloring material and the first and second compounds;

the step including a step of causing the coloring material in the ink to be adsorbed or bound to the surface of the micro-particles in the liquid composition, while maintaining the molecular state of the coloring material in the ink.

In still another aspect of the invention, there is provided an image forming method comprising a step of causing an ink containing a coloring material and a liquid composition containing a first compound in the form of micro-particles reactive to the coloring material and a second compound also reactive to the coloring material to react with each other as liquid-liquid reaction on a recording medium and forming colored sections containing the coloring material and the first and second compounds;

the step including:
a step of causing the coloring material in the ink to be adsorbed or bound to the surface of the micro-particles in the liquid composition, while maintaining the molecular state of the coloring material in the ink; and
a step of causing the coloring material in the ink to react with the second compound in the liquid composition.

In still another aspect of the invention, there is provided an image forming method comprising a step of causing an ink containing a coloring material and a liquid composition containing a first compound in the form of micro-particles reactive to the coloring material and a second compound also reactive to the coloring material to react with each other as liquid-liquid reaction on a recording medium and forming colored sections containing the coloring material and the first and second compounds;

the step including:
a step of causing the coloring material in the ink to be adsorbed or bound to the surface of the micro-particles in the liquid composition, while maintaining the molecular state of the coloring material in the ink;
a step of causing the micro-particles to become less dispersed and coagulate as a result of adsorbing or binding the coloring material to the surface thereof; and
a step of causing the coloring material in the ink to react with the second compound in the liquid composition.

In still another aspect of the invention, there is provided an image forming method comprising a step of causing an ink containing a coloring material and a liquid composition containing a first compound in the form of micro-particles reactive to the coloring material and a second compound also reactive to the coloring material to react with each other as liquid-liquid reaction on a recording medium and forming colored sections containing the coloring material and the first and second compounds;

the step including:
a step of causing the coloring material in the ink to be adsorbed or bound to the surface of the micro-particles in the liquid composition, while maintaining the molecular state of the coloring material in the ink;
a step of causing the micro-particles to become less dispersed and coagulate as a result of adsorbing or binding the coloring material to the surface thereof; and
a step of causing the part of the coloring material not participating in the reaction with the micro-particle in the liquid composition to react with the second compound in the liquid composition.

In still another aspect of the present invention, there is provided an image formed by causing an ink containing a coloring material and a liquid composition containing a first compound in the form of micro-particles reactive to the coloring material and a second compound also reactive to the coloring material to react with each other as liquid-liquid reaction on a recording medium, the image containing colored sections therein;

the colored sections containing the coloring material of the ink in a state of being adsorbed or bound to the micro-particles of the liquid composition as single molecules and in a state of having reacted with the second compound of the liquid composition.

In a further aspect of the present invention, there is provided a method of alleviating bleeding appearing along the boundary lines of first areas of a color and second areas of another color located respectively adjacent to the first areas in an image formed by applying liquid droplets to a recording medium;

at least either the first areas or second areas being colored sections formed by causing ink containing a coloring material and a liquid composition containing a first compound in the form of micro-particles reactive to the coloring material and a second compound also reactive to the coloring material to react with each other as liquid-liquid reaction on a recording medium, the colored sections containing therein the coloring material of the ink in a state of being adsorbed or bound to the micro-particles of the liquid composition as single molecules and in a state of having reacted with the second compound of the liquid composition.

While it is not still clear why the objects of the present invention are achieved by the above described arrangements, the theories proposed by the inventors of the present invention will be briefly discussed below.

One of the theorems underlying the fact that an image showing a highly coloring property is obtained according to the invention is that the coloring material contained in the ink is dispersed and positionally fixed without becoming laked by utilizing the electrostatic force that arises between the molecules of the coloring material and the micro-particles. On the other hand, the ink becomes less bleeding and water-resistant as a result of allowing the coloring material to become laked. While this may appear contradictory, it seems that both the coloring effect and the effect of becoming less bleeding and water-resistant of the coloring material are made to coexist in a well-balanced subtle way. To prove this, the inventors of the present invention conducted an experiment, which will be discussed below. Firstly, a liquid composition same as the one described above in terms of any of the different aspects of the invention except that the second cationic substance was not contained was prepared and mixed with ink to observe the ratio of the dye molecules adsorbed to the micro-particles. While the ratio varied slightly depending on the type of the micro-particles and the type and composition of the ink, it was found that about ⅓ of the overall dye molecules contained in the ink were adsorbed to the micro-particles. In other words, a highly coloring property can be obtained satisfactorily for ink when ⅓ of the overall dye molecules contained in the ink are dispersed in the surface layer of a sheet of paper in an isolated state. Then, the remaining ⅔ of the dye molecules that are not constrained by the cationic micro-particles are fixed deep in the paper as the ink permeates there, although ink can flow into adjacent sections of the image to give rise to a bleeding phenomenon if the paper is plain paper where ink permeates only slowly. While the stripy unevenness of the formed image may be dissolved by the bleeding of ink if ink flows into adjacent sections of the image only moderately, it is essential to control the flow of ink and hence that of the part of the coloring material contained in the ink that does not participates in the reaction with the cationic micro-particles in order to reliably alleviate the bleeding. Additionally, some of the molecules of the dye that are not positionally constrained can also flow out when the image formed on the sheet of paper is wetted if partly. Still additionally, it was found some of the micro-particles can also flow out, carrying the dye molecules adsorbed thereto, under certain conditions because they are not positionally constrained either. Thus, these facts explains why the effect of becoming less bleeding and water-resistant is not remarkable on certain plain paper.

Based on the above results of the experiment, the inventors of the present invention came to believe that both the highly coloring effect and the effect of alleviating the bleeding and making the coloring material water-resistant can be realized simultaneously when some of the molecules of the coloring material are adsorbed to the micro-particles and positionally fixed as independent molecules in the surface layer of the recording paper and the remaining molecules of the coloring material that are not adsorbed to the micro-particles are turned insoluble by the cationic compound and positionally constrained.

As a matter of fact, the coloring property and the effect of suppressing the bleeding phenomenon and becoming water-resistant of the ink were improved in the above experiment when the liquid composition contained a first cationic compound in a state of micro-particles and a second cationic compound in a well balanced way.

If compared with a cationic polymer showing a high molecular weight, a water-soluble metal salt that is used as cationic compound with micro-particles for the purpose of the present invention makes the coloring material less coagulating and more positionally constrained to improve the coloring property, the water resistance and the effect of suppressing the bleeding.

It was also found that the use of a water-soluble cationic metal salt provides additional advantages of improving the preservability of the liquid composition particularly in terms of the effect of suppressing the thixotropic property due to a raised viscosity in a low temperature environment. While the reason for this is not clear, the inventors of the present invention presume that the water-soluble metal salt in the liquid composition affects the surface condition of the micro-particles in some way or another to raise the electrostatic repelling force and consequently improve the dispersibility of the micro-particles at low temperatures. If the water-soluble cationic metal salt becomes acidic in water, it is possible to eliminate the need of using acid or suppress the rate of adding it in order to accelerate the ionization of the surface of the micro-particles and encouraging the micro-particles to disperse quickly. Therefore, the use of such a salt is preferable from the viewpoint of corrosion resistance and safety.

As a result of a series of experiments conducted by the inventors of the present invention, it was found that the total amount of the water-soluble cationic metal salt is preferably less than that of the micro-particles in the liquid composition. More preferably, the ratio of the total amount of the water-soluble cationic metal salt to that of the micro-particles in the liquid composition is ⅕ or less (in terms of weight).

BRIEF DESCRIPTION OF THE DRAWINGS

FIGS. 10A, 10B, 10C (with FIGS. 10CA and 10CB) and 10D are schematic cross sectional views of a sheet of coat paper, showing only a part of the surface thereof, where a colored section is formed as a result of different steps of an ink-jet recording operation.

FIGS. 13A, 13B, 13C, 13D, 13E and 13F are schematic illustrations of the wiping motion of an ink-jet printing apparatus as shown in FIG. 12, of which FIG. 13A shows the rising motion of the blade for ink, FIG. 13B shows the wiping motion of the printing head, FIG. 13C shows the falling motion of the blade for ink, FIG. 13D shows the rising motion of both the blades that takes place after the liquid composition is located at proper positions, FIG. 13E shows the wiping motion of the liquid composition and the second black ink head and FIG. 13F shows the subsequent falling motion of both the blades.

DETAILED DESCRIPTION OF THE INVENTION

Now, an image recorded by a method according to the invention will be described below.

To begin with, the term "isolated molecular state" will be defined. An "isolated molecular state" refers to a state where a coloring material, which may typically be a dye or a pigment, is substantially held in a dissolved or dispersed condition in ink. If the coloring material coagulates to a small extent, it may also be in an "isolated molecular state" so long as its saturation is not degraded for the purpose of the present invention. While a dye as used preferably can be literally in an "isolated molecular state", the term "isolated molecular state" will be used in a broader sense for coloring materials other than dyes for the sake of convenience.

Firstly, the role of micro-particles as a first cationic substance will be discussed.

Figure 11:
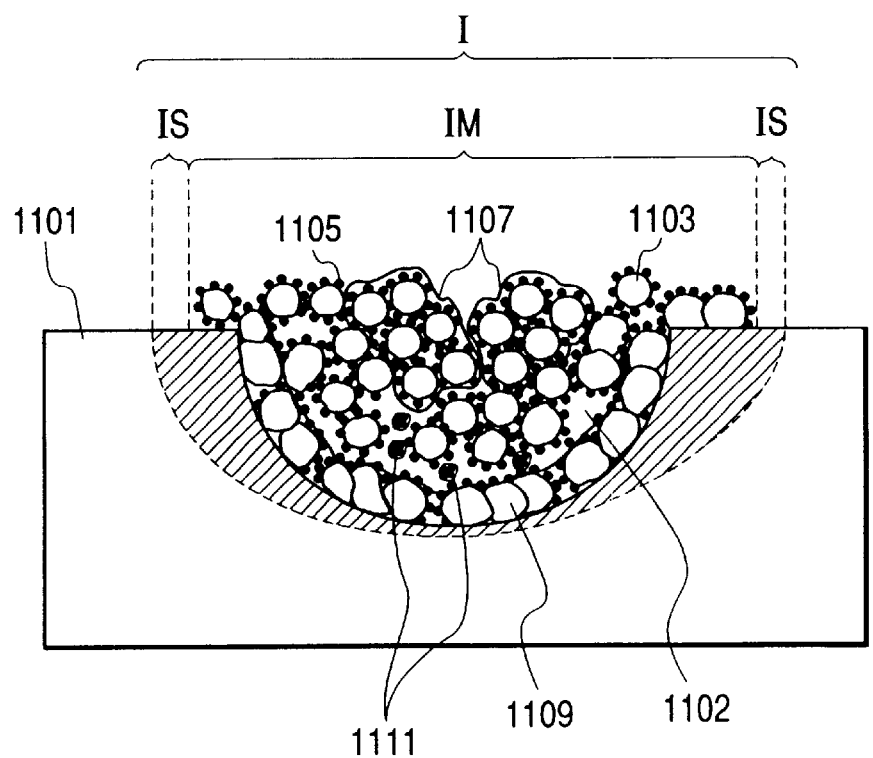
FIG. 11 is a schematic cross sectional view of a sheet of paper, showing only a part of the surface thereof, where a colored section is formed as a result of an ink-jet recording operation according to the invention.

FIG. 11 is a schematic cross sectional view of a sheet of paper, showing only a part of the surface thereof, where a colored section I is formed as a result of an ink-jet recording operation according to the invention to comprise a main image area IM and a surrounding area IS. In FIG. 11, reference numeral 1101 denotes a recording medium and reference numeral 1102 denotes gaps formed among fibers of the recording medium. Additionally, in FIG. 11, reference numeral 1103 denotes micro-particles adapted to adsorb a coloring material 1105.

As shown in FIG. 11, in the image recorded by the ink-jet recording method according to the invention, the main image area IM is formed by the micro-particles 1103 to the surface of which the coloring material 1105 is adsorbed uniformly in an isolated or quasi-isolated molecular state (to be referred to as "isolated molecular state" hereinafter) and aggregates 1107 of the micro-particles holding the coloring material in an isolated molecular state. In FIG. 11, reference numeral 1109 denotes the aggregates of micro-particles found near the fibers of the recording medium in the main image area IM, which is formed through a step where the micro-particles 1103 are physically or chemically adsorbed to the fibers of the recording medium and a step where the coloring material 1105 and the micro-particles 1103 are adsorbed in a liquid-liquid state. Therefore, the coloring property of the coloring material itself is scarcely damaged so that an image showing a high degree of optical density and saturation and can be formed on a recording medium such as a sheet of plain paper into which ink can easily permeate, with a wide spectrum of color reproducibility comparable to coat paper.

On the other hand, the part of the coloring material that does not participate in the process of being adsorbed to the surface of micro-particles 1103 reacts with the cationic compound contained in the liquid composition to produce aggregates 1111. Thus, it is now possible to control the behavior of the part of the coloring material that does not participate in the reaction with micro-particles in image forming areas. Presumably, this is one of the reasons why a liquid composition according to the invention can suppress the bleeding phenomenon. As pointed out earlier, it is desirable that the coloring material is found in an isolated molecular state in image forming areas to improve the coloring property of the material. Additionally, while it is not desirable that aggregates of the coloring material are found in image forming areas from the viewpoint of improving the coloring property, the effect of improving the coloring property due to the use of micro-particles is not damaged if aggregates are formed in those areas. Presumably this is because aggregates 1111 of the coloring material are found in some of the gaps among the micro-particles adsorbing or binding the coloring material in an isolated molecular state and the reaction of the coloring material and the cationic compound proceeds more quickly than the reaction of the coloring material and the cationic micro-particles so that the aggregates 1111 precipitate earlier than the micro-particles adsorbing or binding the coloring material and hence are found relatively densely in a lower part of the colored sections of the image.

FIGS. 10A through 10D are schematic cross sectional views of a sheet of paper, showing only a part of the surface thereof, where a colored section is formed as a result of different steps of an ink-jet recording operation. In FIGS. 10A through 10D, reference numeral 1201 denotes an area primarily containing the reaction product of the ink and the liquid composition, which may be that of the coloring material and the micro-particles, (to be referred to as "reaction area" hereinafter) and corresponds to the main image area IM in FIG. 11. Reference numeral 1202 denotes an area formed by the part of the ink that does not practically participate in the reaction with the liquid composition and flows into the periphery of the reaction area 1201 (to be referred to as "ink-outflow area" hereinafter) and corresponding to the surrounding area IS in FIG. 11. The colored section 1200 is typically formed in a manner as described below. Note that, in FIGS. 10A through 10D, reference numeral 1205 denotes a gap formed between the recording medium and the corresponding fibers that is shown only schematically.

Firstly, the liquid composition 1206 reactive to the coloring material 1204 is applied to the recording medium 1203 in the form of liquid droplets (FIG. 10A). As a result, a liquid pool 1207 of the liquid composition is produced (FIG. 10B). In the liquid pool 1207, the micro-particles 1209 located close to the surface of the fibers of the recording medium are physically or chemically adsorbed to the surface. At this time, probably the dispersion of micro-particles becomes unstable to produce aggregates 1211 of micro-particles. On the other hand, the micro-particles 1209 located away from the fibers in the liquid pool 1207 probably remain in the original dispersed state.

Then, ink 1213 is applied to the recording medium 1203 also in the form of liquid droplets (FIG. 10B). As a result, the coloring material 1204 is firstly chemically adsorbed to the micro-particles 1209 located along the interface of the ink 1213 and the liquid pool 1207 (FIG. 10C). Since this reaction is one that occurs between two liquids (liquid-liquid reaction), the coloring material 1204 is adsorbed uniformly to the surface of the micro-particles 1209 in an isolated molecular state (FIG. 10CA). In other words, probably the coloring material will not coagulate or, if it does, coagulate only slightly near the surface of micro-particles. As a result, a large number of micro-particles to which the coloring material 1204 is adsorbed in an isolated molecular state are found in a surface area of the reaction area 1201 so that the coloring material remains in an isolated molecular state in the surface layer that influences most the coloring effect and hence the image formed there shows a high degree of optical density and saturation.

Then, the micro-particles to which the coloring material 1204 is adsorbed presumably coagulate because their dispersed state is unstable (FIG. 10CA). In other words, the aggregates 1215 formed there retains the coloring material in an isolated molecular state also in the inside thereof. Thus, the image formed there shows a high degree of optical density and saturation.

Additionally, the coloring material 1204 that has not reacted is diffused in the liquid pool 1207 and adsorbed to the surface of the micro-particles 1209 that have not reacted yet either. As a result, the reaction proceeds further in the inside of the liquid pool 1207 to improve the degree of optical density and saturation of the formed image. As described earlier, the aggregates 1211 of micro-particles formed on the surface of the fibers of the recording medium probably play a role of suppressing the permeation of the liquid in the liquid pool 1207 into the recording medium. Therefore, the micro-particles 1209 contained in the liquid composition and the coloring material 1204 that is prevented from permeating coexist to a large extent in a mixed state. Then, the coloring material 1204 and micro-particles 1209 highly probably contact with each other and hence the reaction proceeds relatively uniformly and thoroughly between them to further improve the degree of optical density and saturation of the formed image.

When the liquid composition 1206 is applied to the recording medium 1203 (FIG. 10A) or when the ink 1213 is applied to the liquid pool 1207 (FIG. 10B), the dispersion of the micro-particles 1209 becomes unstable because of the changes in the dispersant of the micro-particles 1209 and some of the micro-particles 1209 may coagulate before adsorbing the coloring material 1204. The term "the changes in the dispersant" as used herein refers to those that can be generally observed when two or more than two different liquids of different types are mixed together such as changes in the pH of the liquid phase, the concentration of the solid contents, the composition of the solvent and the ion concentration of the liquid and so on. These changes occur rapidly in a complex way when the liquid composition is brought into contact with the recording medium and/or the ink to consequently destruct the stability of the dispersion of the micro-particles and produce aggregates. The produced aggregates probably bring forth the effects of filling the gaps and holding the micro-particles to which the coloring material is adsorbed near the surface of the recording medium. Additionally, the aggregates that are formed in the liquid pool 1207 partly can move in the liquid phase and partly are adsorbed to the recording medium. Then, the aggregates showing mobility adsorb the coloring material to the surface thereof to become aggrandized to consequently improve the coloring property of the ink as in the above described process of the reaction of the coloring material and micro-particles. They move with the liquid phase when the latter penetrates into the inside of the recording medium along the fibers of the recording medium so as to fill the gaps and smooth the surface of the recording medium and operate to improve the optical density and its evenness of the image.

That the present invention can provide an image that shows a highly coloring effect will be clearly understood from the description to be made hereinafter. This is probably because the coloring material is adsorbed to the micro-particles in an isolated molecular state and held to the surface of the recording medium in that state. The coloring material is adsorbed in an isolated molecular state and the micro-particles left on the surface of the recording medium are positionally fixed to the surface of the recording medium. As a result, the formed image becomes highly durable. While the liquid composition and the ink are applied sequentially to the recording medium in the mentioned order in the above description, the order of applying the ink and the liquid composition to the recording medium is by no means limited to the above described one and, instead, the ink may be applied first before the liquid composition if a liquid-liquid mixture of the ink and the liquid composition is securely obtained.

Additionally, as shown in FIG. 10B, at least part of the micro-particles in the liquid composition applied to the recording medium may permeate into the inside of the recording medium along with the liquid solvent of the ink. On the other hand, not all the coloring material in the ink may be adsorbed or bound to the micro-particles on the recording medium. Instead, some of the coloring material may also penetrate into the inside of the recording medium along with the liquid solvent of the ink. As shown in FIG. 10D, it is presumable that the coloring material is adsorbed to the micro-particles in the inside of the recording medium that have got to there earlier. Thus, the micro-particles in the inside of the recording medium to which the coloring material is adsorbed or bound in an isolated molecular state also assist to improve the coloring property of the ink. Additionally, the coloring material will be fixed more reliably as the liquid solvent permeantes.

Meanwhile, the second cationic substance 1215 contained in each liquid droplet 1206 of the liquid composition is believed to alleviate the bleeding of ink as it comes to contact with the anionic aqueous ink that contains the coloring material to give rise to at least either of phenomenon (1) and phenomenon (2), which will be discussed below.

(1) The second cationic substance contained in the liquid composition is bonded to the anionic coloring material as a result of ionic or molecular interaction to isolate the latter from the solution phase and produce aggregates 1111 of the coloring material. Then, the produced aggregates become less penetrable into the gaps among the fibers of the recording medium, which may be a sheet of paper, to reduce the mobility of the dye on the recording medium to a level far lower than that of the solvent.

(2) The second cationic substance contained in the liquid composition is bonded to the anionic coloring material as a result of ionic or molecular interaction to isolate the latter from the solution phase and produce aggregates 1111 of the coloring material. Additionally, the second cationic substance narrows the gaps among the fibers of the recording medium to substantially block the aggregates of the coloring material from getting into the gaps of the fibers of the recording medium and consequently reduce the mobility of the dye on the recording medium to a level far lower than that of the solvent.

Since the coloring material is adsorbed to the surface of the cationic micro-particles due to the effect of the first cationic substance, the coloring property of the coloring material is not damaged but improved remarkably. The part of the dye that is not adsorbed nor bound to the surface of the first cationic substance (cationic micro-particles) causes the coloring material to form aggregates 1111 under the effect of the second cationic substance 1215 so that the mobility of the part of the coloring material that has not reacted with the micro-particles on the recording medium is by far lower than that of the solvent and consequently, if ink of some other color is applied to the recording medium at positions adjacent to the colored area, the part of the coloring material that has not reacted with the micro-particles is positionally constrained by the produced aggregates 1111 to eliminate or substantially suppress the generation of bleeding along the boundary areas of the ink droplets. As described above, the first cationic substance mainly improves the coloring property of the coloring material, whereas the second cationic substance mainly operates to suppress the bleeding of the coloring material. Additionally, since both the first and second cationic substances operate to hold the coloring material in the ink to and near the surface of the recording medium, the image produced by the coloring material is almost free from white haze and color unevenness in the areas of the image where ink is applied to a lesser extent such as shaded portions and solid print portions of the image.

Additionally, according to the invention, since the first cationic substance and the coloring material react with each other in a liquid phase on the surface of the recording medium, the coloring material can be made to be adsorbed effectively and efficiently to the surface of micro-particles of the first cationic substance. On the other hand, cationic porous micro-particles have to be consumed at an enhanced rate in order to achieve a comparable level of adsorption of the coloring material on coat paper for ink-jet printing so that a thick ink receiving layer has to be formed to cover the base paper with micro-particles. While this may damage the texture of the base paper of coat paper, the rate of consumption of micro-particles can be reduced according to the invention so that an image that is formed according to the invention does not show any difference of image quality between the printed areas and the unprinted areas and is free from any such damage to the texture of the recording medium.

DESCRIPTION OF THE PREFERRED EMBODIMENTS

Now, the present invention will be described further by referring to preferred embodiments of the invention.

Liquid Composition

Embodiment 1

Now, a first embodiment of liquid composition according to the invention will be described below. It contains two cationic substances including a first cationic substance and a second cationic substance that are different from each other. For the purpose of the present invention, the first cationic substance typically contains micro-particles whose surface is cationic and the liquid composition may show a pH value between 2 and 7 and a zeta potential between +5 and +90 mV.

The cationic substance comprising micro-particles and used in this embodiment is desired to show certain effects including the following.

1) It does not adversely affect the proper color of the coloring material and positively adsorbs the coloring material when the ink is mixed with the cationic substance.
2) It loses the dispersion stability and becomes to be left on the surface of the recording medium when mixed with the ink or applied to the recording medium.

Micro-particles showing these and other effects are preferably used. Note that the above effects may be realized by micro-particles of a single type or those of two or more than two different types.

The effect of 1) above can be realized when the micro-particles show certain values in terms of dimensions, weight and surface profile in addition to the cationic nature of the surface. For example, porous micro-particles having a large number of fine pores on the surface shows specific adsorption characteristics and can adsorb certain coloring materials depending on a number of factors including the size and profile of the fine pores.

The effect of 2) above can be realized as a result of interaction with the ink or the recording medium. Therefore, for example, micro-particles may well show the ionic property opposite to that of any of the ingredients of the ink composition or the components of the recording medium. Additionally, the dispersion stability of micro-particles may be affected when an electrolyte is made to coexist in the ink or the liquid composition.

For the purpose of the present invention, it is desirable that the effect of either 1) or 2) above can be obtained instantaneously. It is more desirable that the effect of 1) and that of 2) above can be obtained simultaneously and instantaneously. Now, a liquid composition containing ionic micro-particles according to the invention will be described more specifically.

Cationic Liquid Composition

A cationic liquid composition according to the invention typically contains micro-particles having a cationic surface and acid, of which the micro-particles are dispersed stably. For the purpose of the invention, a cationic liquid composition containing acid and showing a pH value regulated to a level between 2 and 7 or a zeta potential between +5 and +90 mV may preferably be used.

pH and Zeta Potential

The zeta potential of a liquid composition according to the invention will be discussed below. Firstly, the theorem of zeta potential will be described. In a system where solid particles are dispersed in liquid and a free electric charge is found on the surface of the solid phase, a charged layer of the opposite electric charge appears in the liquid phase at positions near the boundary of the solid phase in order to maintain the electric neutrality of the system. Ths is referred to electric double layer and the potential difference due to the electric double layer is referred to as zeta potential. The surface of the micro-particles is cationic when the zeta potential is positive, whereas it is anionic when the zeta potential is negative. Generally speaking, the electrostatic repelling power appearing among the micro-particle increases as a function of the absolute value of the zeta potential to provide a good dispersibility, revealing the possible strong ionic property of the surface of the micro-particles. In other words, when the zeta potential of the cationic micro-particles is high, the liquid composition is highly cationic and hence strongly attracts the anionic coloring material contained in the ink.

As a result of intensive research efforts of the inventors of the present invention, they found that the anionic coloring material contained in the ink is adsorbed effectively to the surface of the cationic micro-particles to become to show an excellent coloring property on the recording medium when the zeta potential of the liquid composition is between +5 and +90 mV. While the reason for this is not clear yet, the inventors presume that the cationic property of the micro-particles is adequate so that the anionic coloring material would not coagulate rapidly and becomes adsorbed evenly to the surface of the micro-particles. As a result, no large lakes of the anionic coloring material are formed so that the coloring material can reliably show the proper coloring property.

Additionally, the inventors of the present invention presume that the micro-particle of a liquid composition according to the invention maintain their cationic property, although weakly, after adsorbing the anionic coloring material to come to show an unstable state of dispersion so that, as a result, the micro-particles are by turn easily adsorbed to the surface of the cellulose fibers found in the recording medium and hence can easily remain on and near the surface of the recording medium. Therefore, the image produced by the coloring material is almost free from white haze and color unevenness in the areas of the image where ink is applied to a greater extent such as shaded portions and solid print portions of the image as in the case of an image formed on coat paper for ink-jet printing. Additionally, since the anionic coloring material is adsorbed highly effectively and efficiently to the micro-particles to give rise to a remarkable coloring effect if compared with coat paper, consumption rate of cationic micro-particle can be reduced significantly to keep the texture of the recording medium and the rub-off resistance of the image formed on it, if the recording medium is plain paper.

More preferably, the zeta potential is between +10 and +85 mV. If the zeta potential is found within this range, the boundaries of the dots produced by solid printing become less conspicuous so that the obtained image is excellent because it is substantially free from stripy unevenness that can be produced as a result of the scanning motion of the recording head. If the zeta potential is between +15 and +65 mV, it is possible to produce an image with an excellent coloring property regardless of the type of paper used for the recording medium.

The pH of a liquid composition according to the invention is regulated in such a way that the zeta potential of the liquid composition is found within the above defined range. Preferably, a liquid composition according to the invention show a pH value between 2 and 7 at 25° C. from the viewpoint of storage stability and the adsorption property of the anionic coloring material. The recording head is prevented from corrosion and the printed areas show a high rub-off resistance when the pH value is more preferably between 3 and 6.

Cationic Micro-particles

Cationic micro-particles refer to those with which the zeta potential is positive.

Therefore, the micro-particles to be used for a liquid composition according to the present invention need to be cationic at the surface thereof. However, micro-particles that can be used for the purpose of the invention includes not only those that are intrinsically cationic but also those that are intrinsically electrostatically anionic or neutral but have a surface treated to become cationic.

Cationic micro-particles that can be suitably used for the purpose of the present invention are not limited to specific types of material and include inorganic micro-particles, organic micro-particles and inorganic/organic composite micro-particles. Examples of inorganic substance in the form of micro-particles that can be used, with being cationized, for the purpose of the invention include silica, alumina, alumina hydrates, titania, zirconia, boria, silica boria, ceria, magnesia, silica magnesia, calcium carbonate, magnesium carbonate, zinc oxide and hydrotalcite. Examples of organic substance in the form of micro- particles that can be used for the purpose of the invention include styrene acryl, conjugate diene type copolymers such as acrylate copolymers, methacrylate copolymers and SBR latex, cationic emulsions of vinyl type copolymers such as ethylene vinyl acetate copolymers, latexes and cationic modified substances such as melamine beads and plastic pigments. Inorganic/organic composites in the form of micro-particles that can be used for the purpose of the invention include inorganic micro-particles having a surface that has functional groups of primary, secondary or tertiary amine salts.

Cationic micro-particles such as those described above that can be used for the purpose of the invention preferably have an average particle diameter between 0.005 and 1 μm as observed by a dynamic light scattering method from the viewpoint of coloring property, color evenness and storage stability. Cationic micro-particles having a size within the above mentioned range can effectively prevent ink from permeating excessively into the inside of the recording medium and possible degradation of the coloring property and the color evenness of the printed image. Additionally, cationic micro-particles having such a size can effectively be prevented from precipitating in the liquid composition to by turn prevent possible degradation of the storage stability of the liquid composition. More preferably, the average particle diameter of cationic micro-particles to be used for the purpose of the invention is between 0.01 and 0.8 μm. Micro-particles having such an average particle size can advantageously maintain the rub-off resistance and the texture of the recorded image that is formed on the recording medium.

While the rate at which cationic micro-particles are used in a liquid composition according to the invention should be determined optimally depending on the substance of the micro-particle, they are preferably used at a rate between 0.1 and 40 weight % more preferably between 1 and 30 weight % and most preferably between 3 and 15 weight %. The use of micro-particles at a rate within the above cited range can reliably from an image with an excellent coloring property and improve the storage stability and the ejection stability of the liquid composition.

Acid

Acid is used for the purpose of the invention to ionize the surface of the first cationic micro-particles, improve the dispersion stability of the micro-particles by raising the surface potential, improve the adsorption property of adsorbing the anionic coloring material contained in the ink and regulate the viscosity of the liquid composition. Any inorganic or organic acid can suitably be used for the purpose of the invention so long as it provides the pH and the zeta potential of the liquid composition with respective desired values and gives a desired dispersing property to the micro-particles.

Specific examples of inorganic acid that can be used for the purpose of the invention include hydrochloric acid, sulfuric acid, sulfurous acid, nitric acid, nitrous acid, phosphoric acid, boric acid and carbonic acid. Examples of organic acid that can be used for the purpose of the invention include carboxylic acids, sulfonic acids and amino acids. Carboxylic acids that can be used for the purpose of the present invention include formic acid, acetic acid, chloroacetic acid, dichloroacetic acid trichloroacetic acid, fluoroacetic acid, trimethylacetic acid, methoxyacetic acid, mercaptoacetic acid, glycolic acid, propionic acid, butyric acid, valeric acid, hexanoic acid, octanoic acid, decanoic acid, lauric acid, myristic acid, palmitic acid, stearic acid, oleic acid, linolic acid, linolenic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, malonic acid, succinic acid, glutaric acid, adipic acid, tartaric acid, maleic acid, fumaric acid, citric acid, phthalic acid, isophthalic acid, terephthalic acid, salicylic acid, p-hydroxybenzoic acid, anthranilic acid, m-aminobenzoic acid, p-aminobenzoic acid, o-methoxybenzoic acid, m-methoxybenzoic acid, p-methoxybenzoic acid, while sulfonic acids that can be used for the purpose of the invention include benzenesulfonic acid, methylbenzenesulfonic acid, ethylbenzenesulfonic acid, dodecylbenzenesulfonic acid, 2,4,6-trimethylbenzenesulfonic acid, 2,4-dimethylbenzenesulfonic acid, 5-sulfosalicylic acid, 1-sulfonaphthalene, 2-sulfonaphthalene, hexanesulfonic acid, octanesulfonic acid and dodecanesulfonic acid. Amino acids that can be used for the purpose of the invention include glycine, alanine, valine, α-aminobutyric acid, γ-aminobutyric acid, β-alanine, taurine, serine, ε-amino-n-hexanoic acid, leucine, norleucine and phenylalanine. Any two or more than two of the above listed acids may be used in combination.

Of the above listed acids, those having a value of 5 or less than 5 for the primary dissociation constant pKa can particularly preferably be used for the purpose of the invention because they are advantageous in terms of the dispersion stability of the cationic micro-particles and the adsorption of the anionic coloring material. Specific examples of such acids include hydrochloric acid, nitric acid, sulfuric acid, phosphoric acid, acetic acid, formic acid, oxalic acid, lactic acid, citric acid, maleic acid and malonic acid. The mixing ratio of the first cationic micro-particles to the acid in a liquid composition according to the invention is preferably between 200:1 and 2:1 and more preferably between 150:1 and 5:5 by weight from the viewpoint of dispersion stability of cationic micro-particles and adsorption of the anionic coloring material. So much for the acid that is used for the purpose of the invention.

Second Cationic Substance

Now, the second cationic substance will be discussed in detail below. For the second cationic substance to be used in this embodiment, an organic compound having a molecular weight between 400 and 10,000, particularly between 400 and 2,000 as determined by means of GPC (gel permeation chromatography) is preferably used if a substance showing a distribution of molecular weight or a polymer or a oligomer is used. This is presumably because, when a liquid composition according to the invention contains such a substance and is made to coexists with a water-soluble dye having anionic radicals or an anionic substance contained in the ink, the substance is quickly bonded to the latter to constrain the mobility of the coloring material and suppress the diffusion and permeation of the coloring material into the recording medium that can otherwise follow the permeation of the solvent into the recording medium. The low molecular weight component of the second cationic compound preferably shows a simple dispersion and has the peak of molecular weight distribution in a range less than 1,000.

If the second cationic substance does not show any molecular weight distribution, it preferably shows a molecular weight between 100 and 1,000 when observed by means of GPC. Specific examples of such cationic substances include salts of inorganic acids such as hydrochlorides, nitrates and sulfates and those of organic acids such as acetates of primary, secondary and tertiary amines (e.g., lauryl amine, coconut amine, stearyl amine, rosin amine, etc.), salts of inorganic acids such as hydrochlorides, nitrates and sulfates and those of organic acids such as acetates of quaternary ammoniums (e.g., lauryltrimethylammonium chloride, lauryldimethylbenzylammonium chloride, benzyltributylammonium chloride, benzalkonium chloride, cetyltrimethylammonium chloride, etc.), pyridinium salt type compounds (e.g., cetylpyridinium chloride, cetylpyridinium bromide, etc.), imidazoline type cationic compounds (e.g., 2-heptadecenyl-hydroxyethylimidazoline, etc.) and ethylene oxide adducts of secondary alkylamines (e.g., dihydroxyethylstearyl amine, etc.).

According to the invention, an amphoteric surface active agent that is cationic in a certain pH range can also be used as the second cationic substance. Specific examples of amphoteric surface active agents that can be used for the purpose of the invention include amino acid type amphoteric surface active agents, or $RNHCH_2$—$CH_2COOH$ type compounds, and betaine type compounds such as stearyldimetyl betaine, lauryldihydroxyethyl betaine. It may be easily understood that, when such an amphoteric surface active agent is used, it is preferable to regulate the pH of the liquid composition to make it show a pH value lower than that of the isoelectric point thereof as it is or when it is mixed with ink on the recording medium. While the low molecular weight component of the second cationic substance is described above by way of examples, it may be needless to say that the present invention is by no means limited to the above listed compounds.

Other examples of the low molecular weight component of the second cationic substance include monomers and oligomers of the compounds that can be used for the high molecular weight component of the second cationic substance, which will be described hereinafter. Examples of compounds that can be used for the high molecular weight component of the second cationic substance include polyallyl amine, polyamine sulfone, polyvinyl amine and chitosan as well as compounds obtained by neutralizing entirely or partly any of the above listed compounds by acid such as hydrochloric acid or acetic acid, although the present invention is by no means limited to those examples. For the purpose of the invention, the molecular weight of a polymer refers to the average molecular weight obtained by means of GPC (gel permeation chromatography) as expressed in terms of the weight average molecular weight reduced to polyethylene oxide.

Still other examples of cationic polymeric substances that can be used for the second cationic substance include a compound obtained by partially cationizing a nonionic polymeric substance. Specific examples of such compounds include copolymer of vinylpyrrolidone and quaternary salt of aminoalkylalkylate and copolymer of acrylamide and quaternary salt of aminomethylacrylamide, although the present invention is by no limited thereto.

While it is desirable that the cationic polymeric substance to be used for the second cationic substance is water soluble, it may alternatively be held in a dispersed state in water like latex or emulsion. A substance whose molecular weight spreads from a low molecular weight region to a high molecular weight region is preferably used for the second cationic substance. Such a second cationic substance may be obtained by means of a single cationic polydisperse polymer having a single repeating unit or a mixture of two or more than two cationic polymers that are structurally different from each other. A polymer or a mixture of a polymer and an oligomer that is used for the high molecular weight component of such a cationic substance and synthetically prepared so as to show a wide distribution of molecular weight may preferably be used for the second cationic substance.

Embodiment 2

Second Cationic Substance Containing Two Compounds

In a liquid composition according to the invention, two or more than two compounds may be used as the second cationic substance. The inventors of the present invention have found that the anti-bleeding effect and the water-resistance of ink according to the invention can vary depending on the types of the cationic compound(s) used for the second cationic substance. Presumably, this is because the extent of adsorption and that of 'laking' (forming lake and isolubilized) which were described earlier can vary depending on the molecular weight and the reactivity of the substance. As a result of a series of experiments conducted by the inventors of the present invention, it was found the anti-bleeding effect of ink was remarkably improved by using a cationic compound having a low molecular weight while the water-resistance of ink was remarkably improved by using a cationic compound having a high molecular weight. The presumable reasons for this will be discussed below.

Since molecules of a compound having a low molecular weight show a vivid Brownian motion, they can encounter molecules of the coloring material in a short period of time. Therefore, the coloring material quickly becomes insoluble by laking and the bleeding effect is suppressed in a short period of time. On the other hand, it is not necessary to make the coloring material quickly become insoluble by laking in order to improve the water-resistance of ink. Rather, it is important that a compound having long molecules is formed and the latter are intertwined with fibers of paper to become insoluble. Then, the part of the coloring material that is not positionally constrained is prevented from flowing out and, at the same time, micro-particles are also positionally bound and prevented from flowing out. This is probably the reason why the use of a cationic compound having a high molecular weight is effective for improving the water-resistance of the ink.

As a result of intensive research efforts on the part of the inventors of the present invention, it was found that the cationic compounds and the micro-particles in a liquid composition according to the invention preferably show a relationship of [total amount of cationic compounds]<[total amount of micro-particles]. Furthermore, the ratio of the cationic compounds relative to the micro-particles is preferably equal to or less than ⅕ (in terms of weight). When two compounds are used as the second cationic substance for the purpose of the invention, preferably a high molecular weight compound having a molecular weight of 500 or more and a low molecular weight compound having a molecular weight of less than 500 are combined.

High Molecular Weight Cationic Compound

For the purpose of the invention, a high molecular weight cationic compound can be synthetically obtained by polymerizing cationic monomers. Examples of monomers that can be used for the purpose of the invention include N,N-dimethylaminoethyl methacrylate ($CH_2=C(CH_3)—COO—C_2H_4N(CH_3)_2$), N,N-dimethylaminoethyl acrylate ($CH_2=CH—COO—C_2H_4N(CH_3)_2$), N,N-dimethylaminopropyl methacrylate ($CH_2=C(CH_3)—COO—C_3H_6N(CH_3)_2$), N,N-dimethylaminopropyl acrylate ($CH_2=CH—COO—C_3H_6N(CH_3)_2$) N,N-dimethylacrylamide ($CH_2=CH—CON(CH_3)_2$), N,N-dimethylmethacrylamide ($CH_2=C(CH_3)—CON(CH_3)_2$), N,N-dimethylaminoethylacrylamide ($CH_2=CH—CONHC_2H_4N(CH_3)_2$) N,N-dimethylaminoethylmethacrylamide ($CH_2=C(CH_3)—CONHC_2H_4N(CH_3)_2$), N,N-dimethylaminopropylacrylamide ($CH_2=CH—CONH—C_3H_6N(CH_3)_2$), N,N-dimethylaminopropylmethacrylamide ($CH_2=C(CH_3)—CONH—C_3H_6N(CH_3)_2$) although not limited thereto.

Low Molecular Weight Cationic Compound

For the purpose of the invention, a low molecular weight cationic compound can be one that contains polyamine. Examples of such compounds that can be used for the purpose of the invention include ethylene amines, polyethylene imine, spermidine and spermine as well as primary, secondary and tertiary amine salt type compounds (e.g., hydrochlorides and acetates of lauryl amine, coconut amine, stearyl amine, rosin amine, etc.), quaternary ammonium salt type compounds (e.g., lauryltrimethylammonium chloride, cetyltrimethylammonium chloride, lauryldimethylbenzylammonium chloride, benzyltributylammonium chloride, benzalkonium chloride, etc.), pyridinium salt type compounds (e.g., cetylpyridinium chloride, cetylpyridinium bromide, etc.), imidazoline type cationic compounds (e.g., 2-heptadecenyl-hydroxyethylimidazoline, etc.) and ethylene oxide adducts of higher alkyl amines (e.g., dihydroxyethylstearyl amine, etc.).

It should be noted here that the present invention is by no means limited to the high molecular weight cationic compounds and the low molecular weight cationic compounds listed above. For instance, an amphoteric surface active agent that is cationic in a certain pH range can also be used for the second cationic substance. Specific examples of amphoteric surface active agents that can be used for the purpose of the invention include amino acid type amphoteric surface active agents or $RNHCH_2—CH_2COOH$ type compounds and betaine type compounds including carboxylic acid salt type amphoteric surface active agents such as stearyldimetyl betaine, lauryldihydroxyethyl betaine as well as sulfate type, sulfonate type and phosphate type amphoteric surface active agents. It may be easily understood that, when such an amphoteric surface active agent is used, it is preferable to regulate the pH of the liquid composition to make it show a value lower than that of the isoelectric point thereof, either as it is or when it is mixed with ink on the recording medium. It may be needless to say that the present invention is by no means limited to the use of the above listed compounds.

Amount of First Cationic Substance and Second Cationic Substance in Liquid Composition The ratio of the sum of the first cationic substance and the second cationic substance contained in the liquid composition of this embodiment of the present invention is preferably between 0.1 and 40 weight %, more preferably between 1 and 30 weight , most preferably between 3 and 15 weight %. If the ratio is within this range, an image showing an excellent coloring effect can be obtained reliably regardless of the type of paper of the recording medium. Additionally, such a ratio provides the liquid composition with a good storage stability and also a good ejection stability. The content ratio of the first cationic substance to the second cationic substance is preferably between 1:1 and 100:1 by weight, more preferably between 2:1 and 50:1 by weight.

Embodiment 3

In this embodiment, a water-soluble cationic metal salt that is generally referred to as inorganic coagulant can preferably be used as the second cationic substance. Examples of such compounds include water-soluble salts of aluminum such as aluminum nitrate, aluminum chloride, aluminum sulfate, polyaluminum chloride, polyaluminum sulfate, aluminum alum, potassium alum and iron-containing aluminum sulfate, water-soluble salts of zirconium such as zirconium oxychloride, zirconium oxynitrate, zirconium oxysulfate, zirconium oxyacetate and zirconium oxyformate and water-soluble salts of ion such as iron sulfate, iron chloride, copperous chloride, polyiron chloride and polyiron sulfate as well as hydrates of these compounds. While the present invention is by no means limited to the above compounds, one or more than one of the above listed compounds may preferably be used as the second cationic substance in this embodiment.

Water-soluble cationic salts of metals that are acidic in aqueous solution can preferably be used for the purpose of the invention because they can ionize the surface of cationic micro-particles and raise the surface potential thereof to improve the dispersion stability of the micro-particles in the liquid. Additionally, when the selected water-soluble cationic metal salt becomes acidic in aqueous solution, the amount of acid to be added to disperse micro-particles can be reduced or nullified to prevent corrosion and improve safety. Specifically, it is preferable that the 1% aqueous solution of the water-soluble cationic metal salt shows a pH value not greater than 6.

Amount of First Cationic Substance and Second Cationic Substance in Liquid Composition The sum of the first cationic substance and the water-soluble cationic metal salt contained in the liquid composition of this embodiment of the present invention is preferably between 0.1 and 40 weight %, more preferably between 1 and 30 weight %, most preferably between 3 and 15 weight %. If the ratio is within this range, an image showing an excellent coloring effect can be obtained reliably regardless of the type of paper of the recording medium. Additionally, such a ratio provides the liquid composition with a good storage stability and also a good ejection stability. The content ratio of the cationic micro-particles to the water-soluble cationic metal salt is preferably between 10:1 and 1,000:1 by weight, more preferably between 20:1 and 100:1 by weight, while it should be adjusted depending on the cationic micro-particles and the water-soluble cationic metal salt to be used. So much for the second cationic substance.

Other Components of Liquid Composition

Now, the other components of the liquid composition of this embodiment will be described below. A liquid composition according to the present invention normally comprises, beside the above-mentioned first cationic substance and the second cationic substance (preferably together with acid), water, a water-soluble organic solvent and other additives. Examples of water-soluble organic solvents that can be used for the purpose of the invention include amides such as dimethylformamide and dimethylacetamide, ketones such as acetone, ethers such as tetrahydrofuran and dioxane, polyalkyleneglycols such as polyethyleneglycol and polypropyleneglycol, alkyleneglycols such as ethyleneglycol, propyleneglycol, butyleneglycol, triethyleneglycol, 1,2,6-hexantoriol, thiodiglycol, hexyleneglycol and diethyleneglycol, lower alkylethers of polyhydric alcohols such as ethyleneglycol methylether, diethyleneglycol monomethylether and triethyleneglycol monomethylether and primary alcohols such as ethanol, isopropyl alcohol, n-butyl alcohol and isobutyl alcohol as well as glycerin, N-methyl-2-pyrrolidone, 1,3-dimethyl-imidazolidinone, triethanolamine, sulforan and dimethylsulfoxide. While the content of the water-soluble organic solvent is not subjected to any specific limitations, it is preferably between 5 and 60 weight %, preferably between 5 and 40 weight % of the entire liquid.

Additives to Liquid Composition

If necessary, a liquid composition according to the invention may additionally comprise a viscosity regulator, a pH regulator, a preservative, one or more than one surface active agents, an antioxidant, an evaporation promoter, a water-soluble cationic compound and/or a binder resin. The selection of one or more than one surface active agents is particularly important for the purpose of regulating the permeability of the liquid composition into the recording medium. A binder resin can be used to improve the rub-off resistance of the cationic micro-particles to such an extent that it does not damage the texture of the recording medium and the storage stability and the ejection stability of the liquid composition. It may be selected from water-soluble polymers, emulsions and latexes.

A liquid composition according to the invention is preferably colorless or white, although it may show a color that matches the color of the recording medium. Additionally, a liquid composition according to the invention and comprising the above components shows a surface tension preferably between 10 and 60 mN/m (dyn/cm), more preferably between 10 and 40 mN/m (dyn/cm), and a viscosity between 1 and 30 mPa·s (cP). (ink)

Now, the ink of an ink set according to the invention will be discussed below. The term "ink set" as used herein refers to a combination of a liquid composition according to the invention and one or more than one inks containing an anionic coloring material. The one or more than one inks obtained by removing the liquid composition from an ink set according to the invention are referred to as ink sub-set. A water-soluble dye containing anionic radicals is preferably used for the coloring material, or if a pigment is used for the coloring material, the ink preferably contains an anionic compound. The ink additionally contains water, a water-soluble organic solvent and, if necessary, other components such as a viscosity regulator, a pH regulator, a preservative, a surface active agent and an antioxidant.

A water-soluble dye containing anionic radicals that is to be used for the purpose of the present invention may be selected without limitation from water-soluble acidic dyes, direct dyes and reactive dyes listed in the Color Index. Additionally, any dyes having anionic radicals such as sulfonic radicals or carboxyl radicals may be used for the purpose of the invention, if they are not listed in the Color Index. Water-soluble dyes as used herein include those whose solubility depends on the pH value.

The ink of an ink set according to the invention may contain a pigment and an anionic compound in place of a water-soluble dye having anionic radicals beside water, a water-soluble organic solvent and, if necessary, other components such as a viscosity regulator, a pH regulator, a preservative, a surface active agent and an antioxidant. The anionic compound may operate as dispersant for the pigment and, if the dispersant for the pigment is not anionic, another anionic compound may be added in addition to the dispersant. Of course, some other anionic compound may be added if the dispersant is an anionic compound.

While any pigments may be used for the purpose of the present invention, those listed below are preferably be used. Carbon black to be used for black pigment ink for the purpose of the invention may be one manufactured by the furness method or the channel method and having a primary particle size between 15 and 40 mim, a specific surface area between 50 and 300 $m^2/g$ as observed by the BET method, a DBP oil absorption rate between 40 and 150 ml/100 g, a volatile content between 0.5 and 10% and a pH value between 2 and 9. Specific examples of commercially available pigments that can be used for the purpose of the present invention include No. 2300, No. 900, MCF 88, No. 40, No. 52, MA7, MA8, No. 2200B (tradenames, available from Mitsubishi Chemical), RAVEN 1255 (tradename, available from Columnbia), REGAL 400R, REGAL 66 OR, MOGUL L (tradenames, available form Cabot), Color Black FW1, Color Black FW18, Color Black S170, Color Black S150, Printex 35, Printex U (tradenames, available from Degussa). Alternatively, carbon black may be specifically prepared for the purpose of the invention.

Pigments that can be used for yellow ink for the purpose of the present invention include C. I. Pigment Yellow 1, C. I. Pigment Yellow 2, C. I. Pigment Yellow 3, C. I. Pigment Yellow 13, C. I. Pigment Yellow 16 and C. I. Pigment Yellow 83, while pigments that can be used for magenta ink for the purpose of the present invention include C. I. Pigment Red 5, C. I. Pigment Red 7, C. I. Pigment Red 12, C. I. Pigment Red 48 (Ca), C. I. Pigment Red 48 (Mn), C. I. Pigment Red 57 (Ca), C. I. Pigment Red 112 and C. I. Pigment Red 122. Pigments that can be used for cyan ink for the purpose of the present invention include C. I. Pigment Blue 1, C. I. Pigment Blue 2, C. I. Pigment Blue 3, C. I. Pigment Blue 15:3, C. I. Pigment Blue 16, C. I. Pigment Blue 22, C. I. Vat Blue 4 and C. I. Vat Blue 6. Pigments of any colors manufactured specifically for the purpose of the present invention may also be used for the coloring material. The pigment is used to a rate between 1 and 20 weight %, preferably between 2 and 12 weight % relative to the total weight of ink.

While any dispersants of water-soluble resin may be used for the pigment contained in ink for the purpose of the present invention, the dispersant has an average molecular weight preferably between 1,000 and 30,000, more preferably between 3,000 and 15,000. Specific examples of dispersants that can be used for the purpose of the invention include hydrophobic monomers such as styrene, styrene derivatives, vinylnaphthalene, vinylnaphthalene derivatives and aliphatic alcohol esters of α or β-ethylenic unsaturated carbonic acid as well as block copolymers, graft copolymers and random copolymers formed from two or more than two monomers selected from acrylic acid, acrylic acid derivatives, maleic acid, maleic acid derivatives, itaconic acid, itaconic acid derivatives, fumaric acid and fumaric acid derivatives as well as their salts.

Resins as listed above are alkali-soluble resins that can be dissolved into an aqueous solution obtained by dissolving a basic substance. Such resins may be homopolymers formed from hydrophilic monomers or salts thereof. Water-soluble resins such as polyvinylalcohol, carboxymethylcellulose and the condensation product of formaldehyde and naphthalenesulfonate. However, the use of alkali-soluble resin is advantages in terms of dispersibility and reduction of the viscosity of the dispersed solution. Water-soluble resin is preferably used at a ratio between 0.1 and 5 weight % relative to the total amount of ink.

Then, the selected pigment and the water-soluble resin are dispersed or dissolved in an water soluble medium. Aqueous media that can preferably be used for pigment type ink for the purpose of the present invention are mixed solvents obtained by mixing water and a water-soluble organic solvent. For the purpose of the invention not ordinary water that contains various ions but ion-exchanged water (de-ionized water) is preferably used. If the dispersant is not an anionic polymer, it is necessary to add an anionic compound to the ink containing the pigment. Anionic compounds that can be used for the purpose of the invention include polymers such as alkali-soluble resins as described above in relation to pigment dispersants and low molecular weight anionic surface active agents.

Specific examples of low molecular weight anionic surface active agents non-limitatively include disodium lauryl sulfosuccinate, disodium polyoxyethylenelauroylethanolamide sulfosuccinate, disodium polyoxyethylenealkylsurfosuccinate, sodium salt of carboxylated polyoxyethylenelaurylether, sodium salt of carboxylated polyoxyethylenetridecylether, sodium polyoxyethylenelaurylethersulfate, triethanolamine polyoxyethylenelaurylethersulfate, sodium polyoxyethylenealkylethersulfate, sodium alkylsulfate and triethanolamine alkylsulfate. For the purpose of the present invention, such an anionic substance is preferably used at a ratio between 0.05 and 10 weight %, preferably between 0.05 and 5 weight % relative to the total amount of ink.

Pigments that can suitably be used for the purpose of the invention include those that do not require any dispersant, which are referred to as self-dispersing pigments. A self-dispersing pigment is formed by bonding at least a type of hydrophilic radical is bound to the surface of the pigment directly or by way of some other atomic groups. At least one of the hydrophilic radicals as listed below can be used for the purpose of the invention. Furthermore, the other atomic groups may include an alkyl radical having 1 to 12 carbon atoms, a phenyl radical that may have a substituent or a naphthyl radical that may have a substituent.

—COOM, —SO$_3$M, —SO$_2$NH$_2$,

—PO$_3$HM, —PO$_3$M$_2$, —SO$_2$NHCOR, (where M represents a hydrogen atom, an alkali metal, ammonium or an organic ammonium and R represents an alkyl radical having 1 to 12 carbon atoms, a phenyl radical that may have a substituent or a naphthyl radical that may have a substituent.)

Ink that is to be used for the purpose of the invention may contain a surface active agent, a defoamer and/or a preservative as additives in addition to the above ingredients, further as well as commercially available water-soluble dyes, in order to provide the ink with desired physical properties.

Surface active agents that can be used for the purpose of the present invention include anion type surface active agents such as salts of aliphatic acids, sulfates of higher alcohols, sulfates of liquid fatty oils and alkylarylsulfonates, and nonion type surface active agents such as polyoxyethylenealkylethers, polyoxyethylenealkylesters, polyoxyethylenesorbitanalkylesters, acetylenealcohol and acetyleneglycol. One or more than one of such surface active agents may be selected and used for the purpose of the invention. While the amount of such surface active agents contained in ink according to the invention may vary depending on the dispersant to be used, it is preferably between 0.01 and 5 weight % relative to the total amount of ink. The accurate rate for adding the active agents is preferably be determined in such a way that the surface tension of the ink is found to be not smaller than 30 dyn/cm because with such a level of surface tension, any possible slippage of print (a phenomenon where ink misses the target spot due to a wet nozzle tip) can be effectively suppressed with a recording system according to the invention.

As described above, for preparing a pigment type ink, firstly pigment is added to an aqueous solution containing at least pigment dispersing resin and water and the mixture is stirred to disperse the pigment by a dispersing means, which will be described hereinafter, and subjected to a centrifugal separation process, if necessary, to obtain a desired disperse solution. Then, the above listed ingredients are added to the disperse solution, which solution is then agitated to produce the intended ink.

If alkali-soluble type resin is used, it is necessary to add a basic substance in order to dissolve the resin. More specifically, the amount of amine or base necessary for dissolving the resin is calculated from the acid value of the resin and at least the calculated amount of amine or base should be added. The amount of amine or base to be added can be determined by using the formula below.

amount of amine or base $(g)$=acid value of resin×molecular weight of amine or base×amount of resin $(g)$/5600

Furthermore, a good dispersion efficiency can be realized by premixing the aqueous solution of the pigment for more than 30 minutes before the dispersing process. The premixing operation can improve the wetting property of the surface of pigment particles and promote the adsorption of dispersant resin to the surface of pigment particles.

Basic substances that can be added to the disperse solution when alkali-soluble resin is used include organic amines such as monoethanolamine, diethanolamine, triethanolamine, methylpropanolamine and ammonia and inorganic basic compounds such as potassium hydroxide and sodium hydroxide.

While any generally available dispersing machine may be used for the purpose of the invention, preferable ones include ball mills and sand mills. The use of a high speed sand mill is particularly advantageous. Specific examples of high speed sand mills include Super Mill, Sand Grinder, Beads Mill, Agitator Mill, Grain Mill, Dainol Mill, Pearl Mill and Cobol Mill (tradenames). If necessary, a water-soluble organic solvent, a surface active agent, a pH regulator, an anti-rust, an anti-mold, an anti-oxidant, an evaporation promoter, a chelating agent, a water-soluble polymer and other additives may be used for ink according to the invention in addition to the above ingredients.

The liquid medium to be used for dissolving or dispersing the coloring material for the purpose of the invention is preferably a mixture of water and a water-soluble organic solvent. Specific examples of water-soluble organic solvents include alkyl alcohols having 1 to 4 carbon atoms such as methyl alcohol, ethyl alcohol, n-propyl alcohol, isopropyl alcohol, n-butyl alcohol, sec-butyl alcohol and tert-butyl alcohol, amides such as dimethylformamide, dimethylacetamide, ketones such as acetone, ethers such as tetrahydrofuran and dioxane, polyalkylglycols such as polyethyleneglycol and polypropyleneglycol, alkyleneglycols having an alkylene radical with 2 to 6 carbon atoms such as ethyleneglycol, propylenegylcol, butyleneglycol, triethyleneglycol, 1,2,6-hexanetriol, thiodiglycol, hexyleneglycol and diethyleneglycol, glycerin, lower alkylethers of polyhydric alcohols such as ethyleneglycolmonomethyl (or ethyl)ether and diethyleneglycolmonomethyl(or ethyl) ether, cyclic amides such as N-methyl-2-pyrrolidone, 1,3-dimethyl-2-imidazolidinone, sulforan, dimethylsulfoxide, 2-pyrrolidone, $\epsilon$-caprolactam and imides such as succinimide.

The content of the water-soluble organic solvent is preferably between 1 and 40 weight %, more prefeably between 3 and 30 weight % relative to the total amount of ink. Water is used by 30 to 95 weight % relative to the total amount of ink. The pigment is dispersed only poorly and the viscosity of ink is raised too high when the water content is less than 30 weight %, whereas evaporation occurs excessively and satisfactory stickiness cannot be obtained when the water content exceed 95 weight %.

While ink according to the invention can be used as ordinary water-soluble ink for pens, it can particularly advantageously be used with an ink-jet recording method of the type adapted to eject ink by utilizing the foaming phenomenon of ink that arises when thermal energy is applied thereto because ink is ejected on a stable basis and no satellite dots will be produced. It should be noted that, when it is used with an ink-jet recording method, its thermal properties (e.g., specific heat, thermal expansion coefficient, thermal conductivity) may have to be regulated.

Additionally, ink according to the invention preferably shows a surface tension between 30 and 68 mN/m (dyn/cm) and a viscosity less than 15 mpa·s (cP), preferably less than 10 mpa·s (cP), more preferably less than 5 mpa·s (cP) at 25° C. in order to improve the permeability of ink in the printed matter when ink is used on plain paper and the matching of ink relative to the ink-jet printing head.

Now, an image forming method according to the invention will be described. An image forming method according to the invention comprises step (A) of causing a liquid composition as described above to adhere to color producing areas (and neighboring areas) on the recording medium and step (B) of shooting ink containing a dye having at least an anionic radical or containing at least an anionic compound and a pigment as droplets through an ejection orifice according to a recording signal. For the purpose of the present invention, the term "a color producing area" refers to an area where an ink dot is made to adhere and "the neighboring area of a color producing area" refers to an area surrounding the color producing area with a distance of about 1 to 5 dots.

For an image forming method according to the invention, it is only necessary that a liquid composition according to the invention and ink coexist on a recording medium. Therefore, it does not matter if the liquid composition is applied to the recording medium first and ink second or vice versa. Additionally, if the liquid composition is applied to the recording medium first, there are no limitations to the time period between the application of the liquid composition to the recording medium and that of ink, although preferably they are applied substantially simultaneously or ink is applied to the recording medium within several seconds after the application of the liquid composition. Any recording medium may be used with an image forming method according to the invention and therefore the use of ordinary plain paper such as copying paper and bond paper is advantageous from the viewpoint of cost, although coat paper specially prepared for ink-jet recording and transparent film to be used for OHPs may also advantageously be used with an image forming method according to the invention. Additionally, wood free paper and glossy paper may also be used with an image forming method according to the invention without any problem.

While a spray or a roller may be used for applying the liquid composition onto the entire surface of a recording medium, an ink-jet method is preferably used for uniformly applying the liquid composition only color producing areas where ink is made to adhere (and neighboring areas). While various ink-jet recording systems may be used with an image forming method according to the invention, the use of a system adapted to eject liquid droplets by means of a bubble generated by thermal energy is particularly advantageous for the purpose of the invention.

Figure 1:
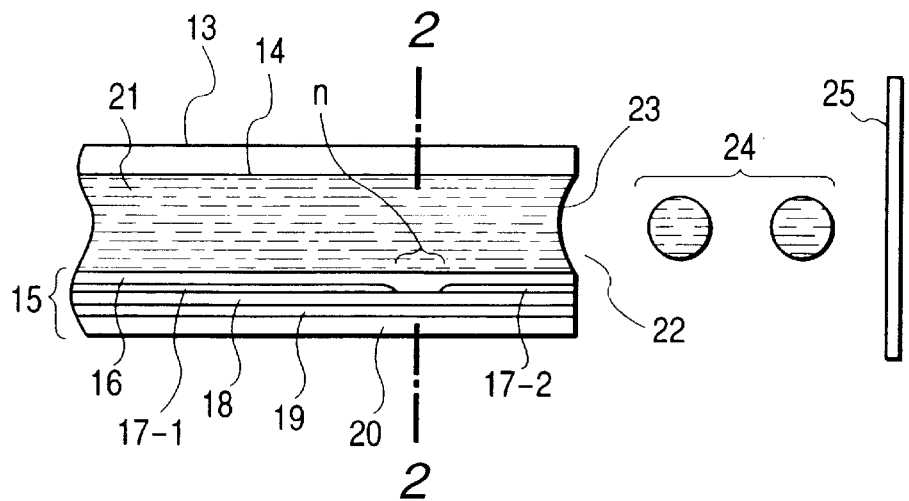
FIG. 1 is a schematic longitudinal cross sectional view of the head of an ink-jet recording apparatus according to the invention.
Figure 2:
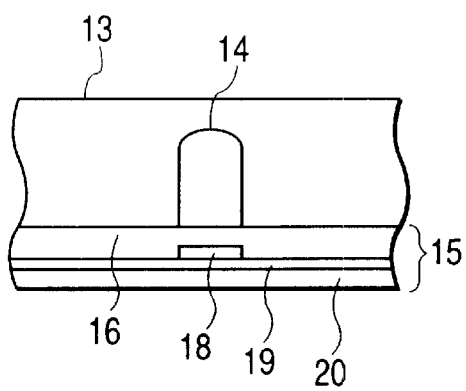
FIG. 2 is a schematic transversal cross sectional view of the head of FIG. 1.
Figure 3:
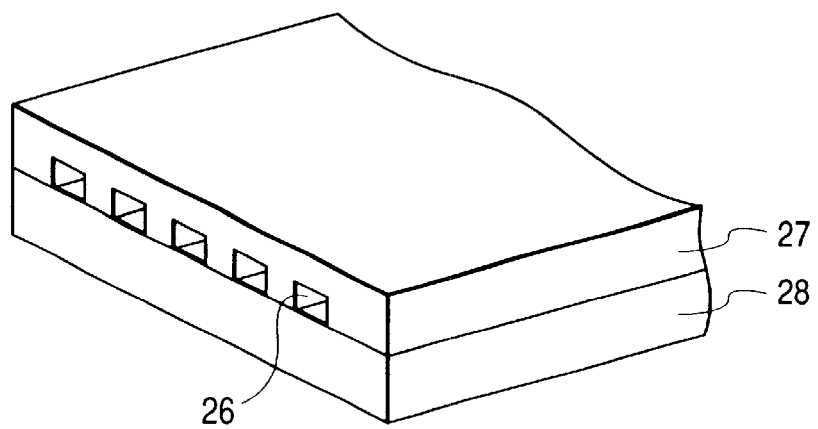
FIG. 3 is a schematic perspective view of the head of FIG. 1.

Now, a recording apparatus according to the invention will be described. For the purpose of the invention, a system adapted to apply a recording signal to the ink in a recording head and causes the head to eject liquid droplets by means of a bubble generated by thermal energy will advantageously be used. FIGS. 1, 2 and 3 schematically illustrate the configuration of a recording head, which is the principal part of the recording apparatus.

The head 13 is obtained by bonding a plate of glass, ceramic or plastic having a groove 14 for leading ink and a heat generating head 15 having a heat generating resister and adapted to be used for thermal recording (while a thin film head is shown in the illustrations, the present invention is by no means limited thereto). The heat generating head 15 comprises a protective film 16 typically made of silicon oxide, aluminum electrodes 17-1 and 17-2, a heat generating resister layer 18 typically made of nichrome, a heat accumulating layer 19 and a substrate 20 typically made of alumina, which is a good heat dissipater.

Recording ink 21 is found in the ejection orifice 22 of the head and forms a meniscus under pressure P. As an electric signal is applied to the aluminum electrodes 17-1 and 17-2, the area indicated by n of the heat generating head 15 vehemently generates heat and a bubble is produced in the part of ink 21 that is held in contact with the area to project the meniscus 23 under the pressure of the bubble so that droplets 24 of ink are shot out of the ejection orifice 22 toward the recording medium 25. FIG. 3 is a schematic perspective view of a recording head obtained by arranging a number of nozzles as shown in FIG. 1. The recording head of FIG. 3 is formed by bonding a glass plate 27 having a number of ink flow paths and a heat generating head 28 similar to the one shown in FIG. 1. Note that FIG. 1 is a schematic cross sectional view of the head 13 taken along the ink flow path and FIG. 2 is a schematic cross sectional view taken along line 2—2 in FIG. 1.

Figure 4:
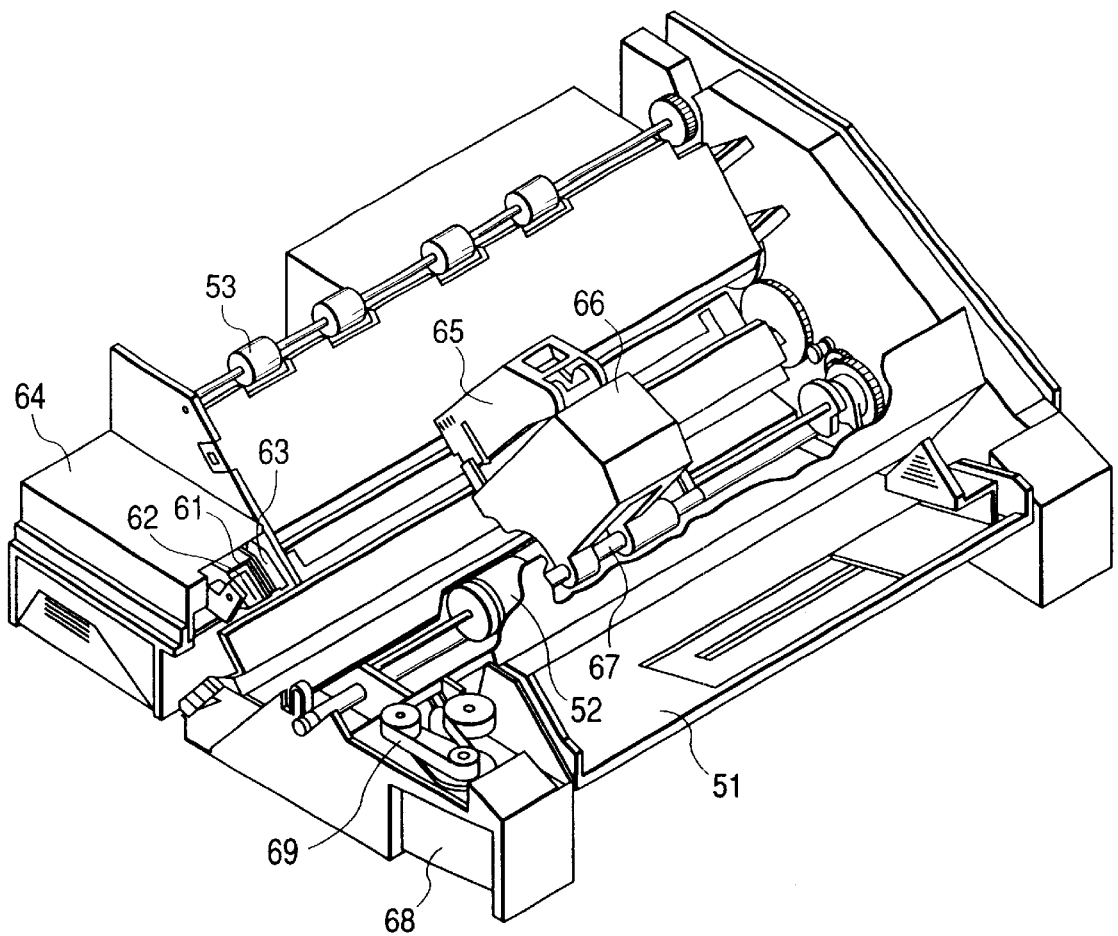
FIG. 4 is a schematic perspective view of an embodiment of ink-jet recording apparatus according to the invention.

FIG. 4 is a schematic perspective view of an ink-jet recording apparatus comprising a head as described above. Referring to FIG. 4, reference numeral 61 denotes a blade that operates as wiping member and is rigidly secured at an end by a blade holding member to form a cantilever. The blade 61 is arranged at a position adjacent to the recording area of the recording head 65. In the case of FIG. 4, the blade 61 is made to project into the transfer path of the recording head 65. Reference numeral 62 denotes a cap for the ejection port surface of the recording head 65 arranged at a position located adjacent to the blade 61, which is the home position of the cap. It is adapted to move in a direction perpendicular to the moving direction of the recording head 65 and abut the ink ejection port surface to cap the latter. Reference numeral 63 denotes an ink absorbent arranged next to the blade 61 and, like the blade 61, made to project into the transfer path of the recording head 65. The blade 61, the cap 62 and the ink absorbent 63 form an ejection recovering section 64 and remove any moisture and dirt adhering to the plane of the ink ejection port.

Reference numeral 65 denotes the recording head having an ejection energy generating means and eject ink onto a recording medium located vis-a-vis the ejection port surface in which the ejection port for recording is arranged and reference numeral 66 denotes a carriage carrying the recording head 65 to move the latter. The carriage 66 is slidably engaged with a guide shaft 67 and (although not shown) connected partly to a belt 69 driven to move by a motor. As a result, the carriage 66 can move along the guide shaft 67 so that the recording head 65 can move to a recording area and its neighboring area.

Reference numeral 51 denotes a feed section adapted to receive a recording medium and reference numeral 52 denotes a feed roller driven by a motor (not shown). With the above described arrangement, the recording medium is fed to a position vis-a-vis the ejection port surface of the recording head 65 and, as the recording operation proceeds, it is discharged into a delivery section provided with a delivery roller 53.

When the recording head 65 returns to the home position after the end of a recording operation, the cap 62 of the ejection recovering section 64 retracts from the transfer path of the recording head 65, while the blade 61 remains projecting into the transfer path of the recording head 65. As a result, the ejection port surface of the recording head 65 is wiped. If the cap 62 is made to abut the ejection port surface of the recording head 65 for capping the latter, the cap 62 is made to move, while also projecting into the transfer path of the recording head 65.

When the recording head 65 is moved from the home position to the recording start position, the cap 62 and the blade 61 are held to the above described wiping position. As a result, the ejection port surface of the recording head 65 is also wiped during this movement. The recording head 65 moves back to the home position not only after the end of a recording operation and at the time of ejection recovery but also at regular time intervals when the recording head 65 moves to a recording area for recording that is located close to the recording area so that the ejection port surface of the recording head 65 is wiped frequently.

Figure 5:
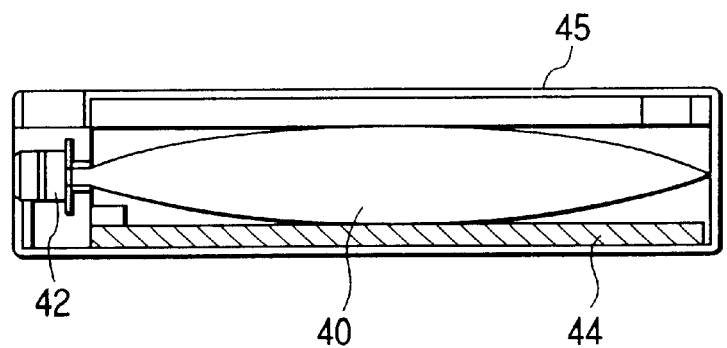
FIG. 5 is a schematic longitudinal cross sectional view of an ink cartridge that can be used for an ink-jet recording apparatus according to the present invention.

FIG. 5 is a schematic cross sectional view of an ink cartridge 45 containing ink, which is supplied to the head by way of a ink feed means such as a tube. In FIG. 5, reference numeral 40 denotes a ink containing section storing ink to be supplied, which may be an ink bag, and having at the front end thereof with a rubber peg 42. Ink can be supplied from the ink bag 40 to the head typically by causing a needle (not shown) to pierce the peg 42. Reference numeral 44 denotes an ink absorbent for receiving waste ink. The surface of the ink containing section that is held in contact with ink is preferably formed by polyolefin, or polyethylene in particular.

Figure 6:
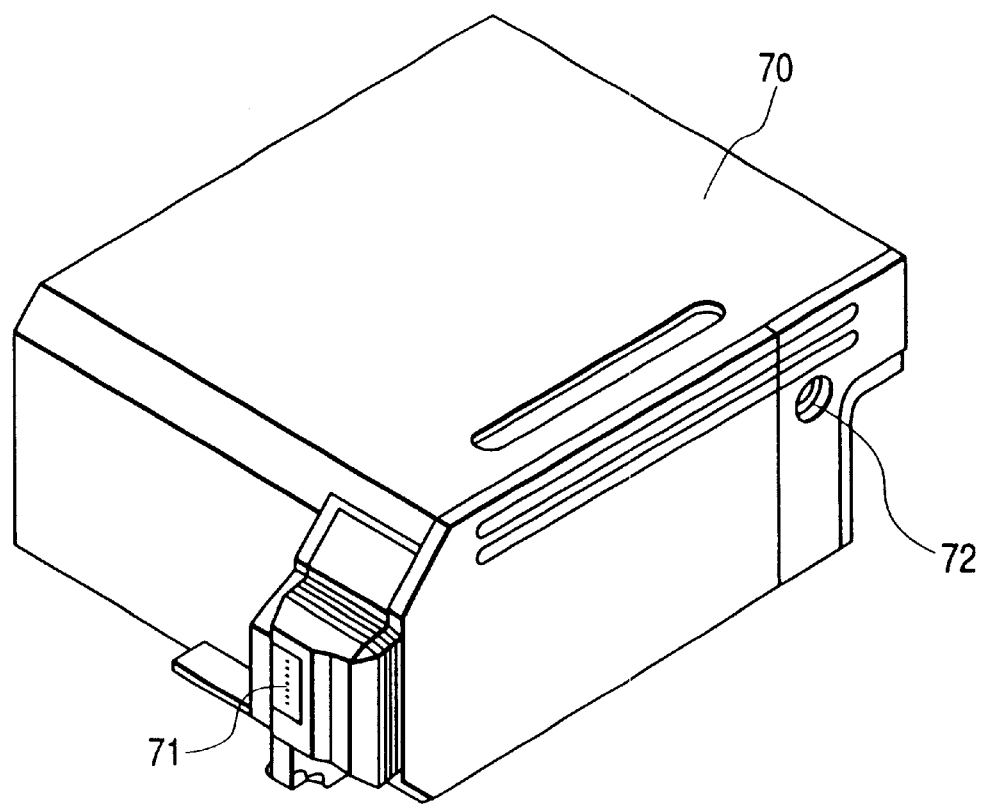
FIG. 6 is a schematic perspective view of a recording unit that can be used for an ink-jet recording apparatus according to the invention.

Ink-jet recording apparatus that can suitably be used for the purpose of the present invention do not necessarily have a head and an ink cartridge arranged separately in a manner as described above but may alternatively have them integrally combined as shown in FIG. 6.

Referring to FIG. 6, reference numeral 70 denotes a recording unit comprising an ink containing section storing ink, which may be an ink absorbent, and ink is supplied from the ink absorbent to head section 71 having a plurality of orifices and subsequently ejected from the latter. The ink absorbent may typically be made of polyurethane. Reference numeral 72 denotes an air communication port for keeping the inside of the recording unit in communication with the atmosphere. The recording unit 70 can replace the recording head as shown in FIG. 4 so that it can be removably fitted to the carriage 66. While recording apparatus to be used for the purpose of the present invention are described in terms of ink-jet rectangular apparatus adapted to eject ink by applying thermal energy to ink, piezoelectric type ink-jet recording apparatus adapted to use a piezoelectric element may also feasibly be used for the purpose of the invention.

Figure 7:
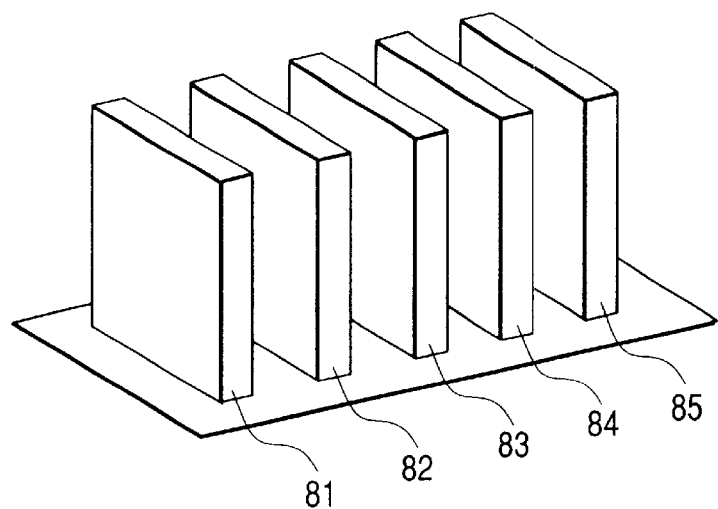
FIG. 7 is a schematic perspective view of a recording unit having a plurality of recording heads arranged in array and in an example for the purpose of the present invention.
Figure 8:
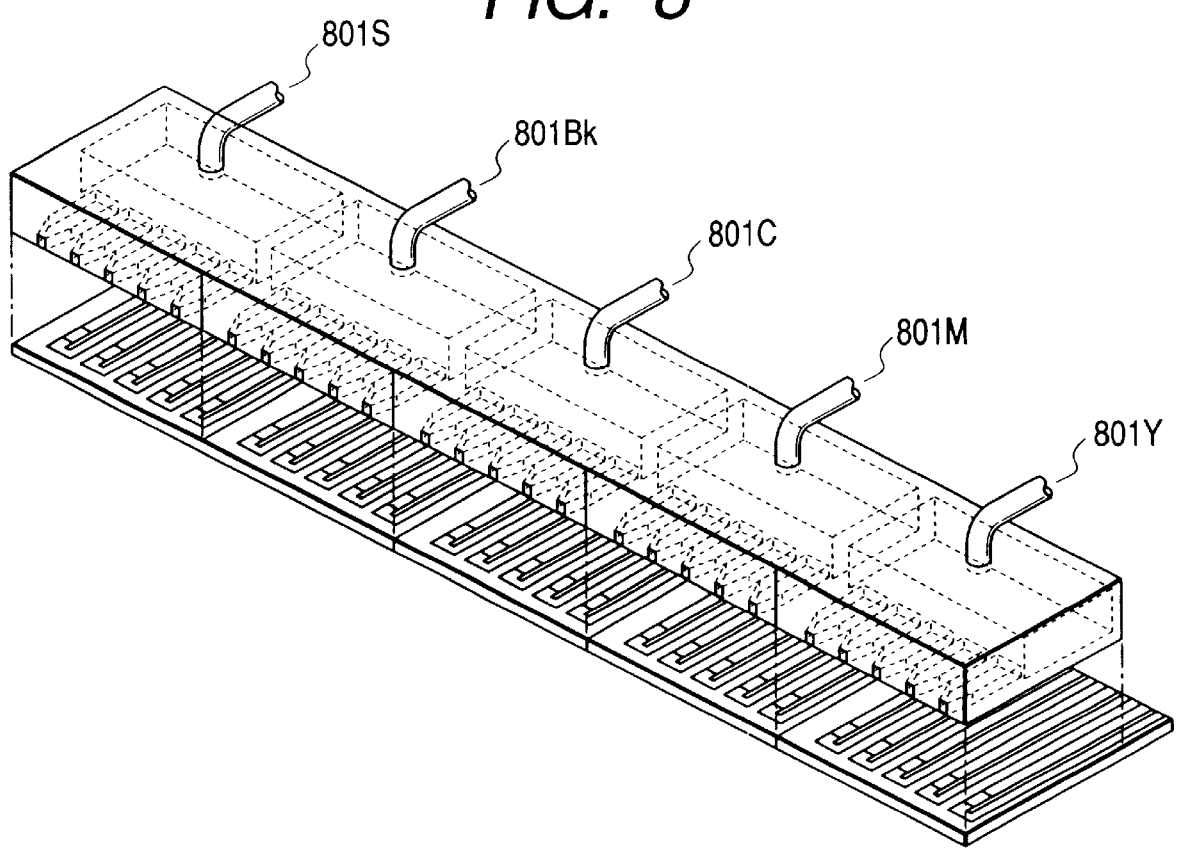
FIG. 8 is a schematic perspective view of another recording head that can be used for the purpose of the present invention.
Figure 9:
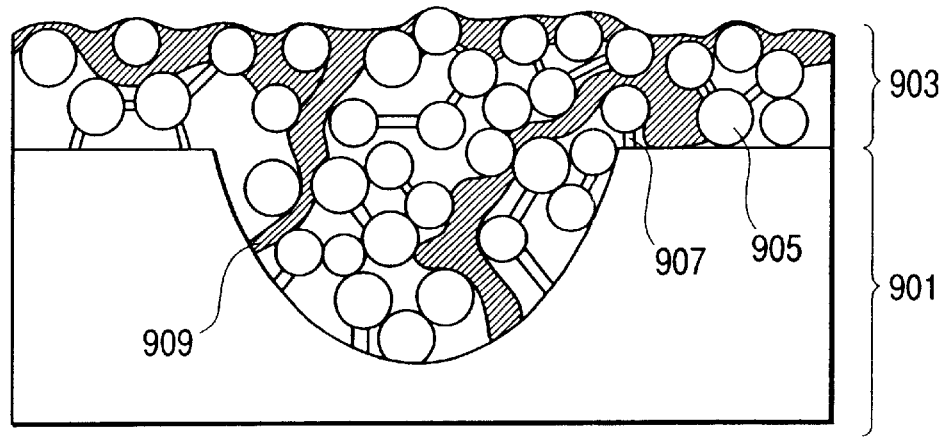
FIG. 9 is a schematic cross sectional view of a sheet of coat paper, showing only a part of the surface thereof, where a colored section is formed as a result of an ink-jet recording operation.

When applying a recording method according to the invention, for example a total of five recording heads may be arranged on a carriage. FIG. 7 shows such an arrangement. In FIG. 7, reference numerals 81, 82, 83, 84 denote respectively recording heads for ejecting recording ink of yellow, magenta, cyan and black. Reference numeral 85 in FIG. 7 denotes a head for ejecting a liquid composition according to the invention. The heads are arranged in the recording apparatus and eject ink of different colors according to a recording signal applied to it. A liquid composition according to the invention may be made to adhere in advance to the areas of the recording medium where at least recording ink of different colors is made to adhere subsequently. While five recording heads are used in FIG. 7, the present invention is by no means limited thereto. Alternatively, a single recording head may be used with a plurality of liquid flow path that are provided respectively for yellow ink, magenta ink, cyan ink, black ink and a colorless liquid composition as shown in FIG. 8. The heads may be so arranged that the liquid composition is applied after ink.

Figure 12:
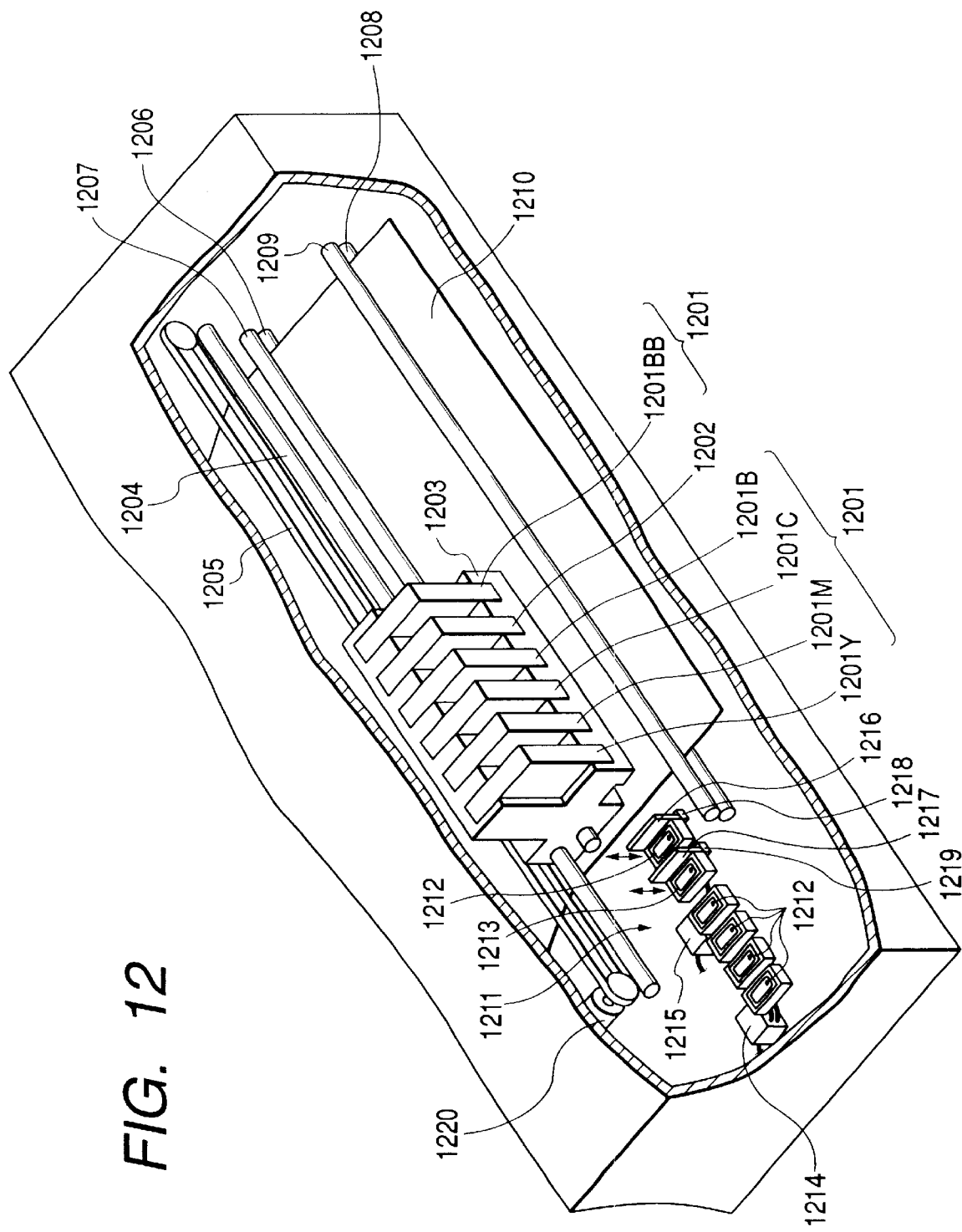
FIG. 12 is a partly cut away perspective view of an embodiment of ink-jet printing apparatus according to the invention.

FIG. 12 is a schematic perspective view of another embodiment of ink-jet printing apparatus according to the invention.

Referring to FIG. 12, there are shown a scanning rail 1204 extending in the main-scanning direction of carriage 1203 to slidingly support the carriage 1203, a drive belt 1205 for transmitting drive force for driving the carriage 1203 to move back and forth. In FIG. 12, reference numerals 1206, 1207 and 1208, 1209 denote feed roller pairs arranged respectively in front and at the back of the printing position of the printing head to pinch and forward the printing medium 1210. The printing medium 1210 that may typically be a roll or sheet of paper pressed by and held in contact with a platen (not shown) at the printing position so that it is positionally constrained and guided forward. Under this condition, the ejection port forming surfaces of the head cartridges (heads) 1201 and 1202 mounted on the carriage 1203 project downward from the carriage 1203 and is located between the feed rollers 1207 and 1209 and held vis-a-vis and in parallel with the recording medium 1210 that is pressed against the guide surface of the platen (not shown).

As shown in FIG. 12, a total of 6 head cartridges are aligned and mounted on the carriage 1203. In the case of the illustrated embodiment, a yellow printing head 1201Y, a magenta printing head 1201M, a cyan printing head 1201C, a black printing head 1201B, a liquid composition ejection head 1202 and a second black printing head 1201BB are arranged from the left end toward the right on the carriage 1203. The liquid composition ejection head 1202 is adapted to eject a liquid composition that reacts with the coloring materials in the ink to the recording medium 1210. The second black printing head 1201BB located at the rightmost position is adapted to use black ink that is used in the subscanning printing of a bidirectional printing operation. In other words, the liquid composition ejection head 1202 is arranged to the right of the black printing head 1201B that is common to all the embodiments and then the second black printing head 1201BB is arranged to the right of the liquid composition ejection head 1202.

Referring to FIG. 12, a recovery unit 1211 is arranged to the left of the printing area and contains caps 1212 arranged at positions corresponding to the arrangement of the head cartridges 1201 and 1202 for the purpose of capping the printing heads 1201Y, 1201M, 1201C and 1201B along with a cap 1213 arranged to the right of the above caps to cap the liquid composition ejection head 1202 and a cap 1212 arranged to the right of the cap 1213 to cap the second black printing head 1201BB. All the caps are vertically movable so that, when the carriage 1203 is at the home position, the caps 1212 and 1213 are pressed against the ejection port forming surfaces of the respective heads 1201 and 1202 to hermetically seal (cap) the ejection ports. Thus, ink is prevented from being thickened to become sticky and ejected defectively as a result of evaporation of the ink solvent in the ejection ports.

The recovery unit 1211 is provided with a suction pump 1214 held in communication with the caps 1212 and a suction pump 1215 held in communication with the cap 1213. These pumps 1214 and 1215 are used to cap the ejection port forming surfaces of the printing heads 1201 and the liquid composition ejection head 1202 by means of the respective caps 1212 and 1213 and perform a suction recovering operation when any of the printing heads 1201 and the liquid composition ejection head 1202 becomes to operate defectively. A blade 1217 is arranged for the liquid composition ejection head 1202 between the cap 1213 for the liquid composition ejection head which is the fifth cap from the left and the cap 1212 for the second black printing head which is the sixth cap from the left, while a blade 1216 is arranged for the printing heads 1201 of different ink colors at the right side (the side of the printing areas) of the rightmost cap 1212. With this arrangement, the blade holders 1218 and 1219 are driven to move up and down by a blade lift mechanism (not shown) that is driven by utilizing the movement of the carriages 1203 so that the blades 1216 and 1217 are made to move between a projecting position (wiping position) for wiping the ink and the foreign objects adhering to the ejection port forming surfaces of the heads 1201 and 1202 and a retracted position (stand-by position) of being kept away from the ejection port forming surfaces. The blade 1216 for wiping the printing heads 1201 and the blade 1217 for wiping the liquid composition ejection head 1202 can move up and down independently relative to each other.

FIGS. 13A through 13F are schematic illustration of the wiping operation of the ink-jet printing apparatus of FIG. 12. As shown in FIG. 13A, after the blade 1216 for wiping the printing heads is made to project (move up), the heads mounted on the carriage 1203 are made to move to the respective home positions from the right side (the side of the printing area). The blade 1216 for wiping the printing heads that is moved up then sequentially wipes the printing heads 1201 as the carriage 1203 moves leftward as shown in FIG. 13B. Then, as shown in FIG. 13C, the blade 1216 is made to retract (move down) to the stand-by position when the liquid composition ejection head 1202 comes to the front (right side) of blade 1216 for the printing heads in order to prevent the blade 1216 from contacting the liquid composition ejection head 1202.

As the carriage 1203 moves further leftward and the liquid composition ejection head passes by the blade 1216 for the printing heads, both the blade 1216 for the printing heads and the blade 1217 for the liquid composition ejection head are made to project (move up) as shown in FIG. 13D. Then, as the carriage 1203 keeps on moving leftward, the blade 1217 and the blade 1216 are driven to wipe the liquid composition ejection head 1202 and the rightmost printing head 1201BB respectively and simultaneously as shown in FIG. 13E. After completing the operation of wiping all the heads 1201 and 1202, the two blades 1216 and 1217 are made to retract (move down) to the stand-by position as shown in FIG. 13F.

While the blades 1216 and 1217 are driven to wipe the respective heads when the carriage 1203 moves from the printing area (right side) toward the home position where the recovery unit 1211 is located in the embodiment of FIG. 12 and FIGS. 13A through 13F, the wiping direction is not limited to that of the above description and the blades may alternatively be so operated that they wipe the respective heads when the carriage moves from the home position toward the right side (the side of the printing area).

Thus, the ink-jet printing apparatus of FIG. 12 is arranged so as to be able to form an image on the recording medium by causing the liquid composition ejection head 1202 to eject a liquid composition according to the invention that is reactive to the coloring materials of ink onto the printing medium and bringing the ejected liquid composition into contact with the ink ejected from the printing heads 1201 on the recording medium 1210. As the coloring materials of ink react with the liquid composition on the recording medium 1210, the coloring materials are adsorbed to the surface of the micro-particles contained in the liquid composition in an isolated molecular state so that the image is formed by the micro-particles to show an excellent coloring effect and a satisfactory color evenness.

As described above in detail, according to the invention, it is now possible to form an image on a plain paper by means of ink-jet recording whose quality is comparable to an image formed on a coat paper specifically designed for ink-jet recording in terms of coloring property and color evenness, while preserving the texture of plain paper. Such an image also shows excellent rub-off resistance with suppressed bleeding. According to the invention, there is also provided a liquid composition that is excellent in terms of storage stability and can be reliably ejected from a recording head.

EXAMPLES

The present invention is described further in detail by referring to specific examples and comparative examples. In those examples, ingredients of liquid compositions are expressed as parts or percents by weight, unless differently mentioned.

Zeta potential was determined for each liquid composition by dispersing the liquid composition in deionized water so as to obtain a dispersion of minute particles with a solid content of 0.1% and conducting measurement by means of a zeta potential meter (mfd. by Brookhaven Co., BI-ZETA plus) using an acrylic cell at a liquid temperature of 20° C. Value of pH was also determined for each liquid composition at 25° C. by means of a pH meter (mfd. by HORIBA, Ltd., Castany D-14 pH meter). Average particle diameter was determined for minute particles by dispersing each liquid composition in deionized water so as to obtain a dispersion of minute particles with a solid content of 0.1% and conducting measurement by means of a particle size distribution meter (mfd. by Brookhaven Co., BI-90) using an acrylic cell at a liquid temperature of 20° C., in accordance with a dynamic light scattering method. Molecular weight was determined by gel permeation chromatography.

Liquid compositions used in the examples were prepared as described below. Ingredients for each liquid composition were combined to be mixed together and then passed under pressure through a membrane filter having a pore size of 1 μm (trade name: Fluoropore Filter, mfd. by Sumitomo Electric Industries, Ltd.) to obtain liquid compositions A, B, C, D, E, F, G, H, I, J, K and L.

| Liquid Composition A: | |
|---|---|
| Ingredients | % by weight |
| glycerin | 7.5 |
| diethylene glycol | 7.5 |
| alumina hydrate | 10.0 |
| (average particle diameter: 0.17 pm) | |
| stearyltrimethylammonium chloride | 0.05 |
| (trade name: Electrostripper QE, mfd. by Kao Corp., MW: 340) | |
| polyallylamine acetate | 0.4 |
| (synthesized, MW: 1,000) | |
| nitric acid | 1.2 |
| water | 73.35 |

The above alumina hydrate was obtained by the following synthesizing process.

Aluminum dodexide was prepared according to the method described in U.S. Pat. No. 4,242,271. The obtained aluminum dodexide was then hydrolized to form alumina slurry according to the method described in U.S. Pat. No. 4,202,870. Water was added to the alumina slurry until the solid content for alumina hydrate becomes 7.9%. Then, since the alumina slurry had a pH value of 9.3, a 3.9% solution of nitric acid was added to adjust the pH value and thereby form a colloidal sol. The colloidal sol was then spray-dried at 83° C. to obtain the alumina hydrate. The alumina hydrate was positively surface-charged in water and therefore showed a cationic property.

Liquid composition A showed a pH value of 3.5 and a zeta potential of +39 mV. After liquid composition A was straged, for testing purpose, in an ink tank at 60° C. for one month under dry condition, no deposit was found in the ink tank and stable ejection from a recording head was performed.

| Liquid Composition B: | |
|---|---|
| Ingredients | % by weight |
| glycerin | 7.5 |
| diethylene glycol | 7.5 |
| colloidal silica | 10.0 |
| (trade name: Snowtex AK, mfd. by Nissan Chemical Industries, Ltd., average particle diameter: 0.02 μm) | |
| stearyltrimethylammonium chloride | 0.1 |
| (trade name: Electrostripper QE, mfd. by Kao Corp., MW: 340) | |
| polyallylamine hydrochloride | 0.3 |
| (synthesized, MW: 8,500) | |
| nitric acid | 0.6 |
| water | 74.0 |

The above colloidal silica had been subjected to surface cationic treatment and therefore showed a cationic property in water.

Liquid composition B showed a pH value of 3.8 and a zeta potential of +68 mV. After liquid composition B was straged, for testing purpose, in an ink tank at 60° C. for one month under dry condition, no deposit was found in the ink tank and stable ejection from a recording head was performed.

| Liquid Composition C: | |
|---|---|
| Ingredients | % by weight |
| glycerin | 7.5 |
| diethylene glycol | 7.5 |
| colloidal zirconia | 5.0 |
| (trade name: $ZrO_2$ Sol, mfd. by Daiichi Kigenso Kagaku Kogyo KK, average particle diameter: 0.10 μm) | |
| stearyltrimethylammonium chloride | 0.5 |
| (trade name: Electrostripper QE, mfd. by Kao Corp., MW: 340) | |
| polyallylsulfon hydrochloride | 4.0 |
| (trade name: PAS-A-1, mfd. by NITTO BOSEKI CO., LTD., MW: 2,000) | |
| nitric acid | 1.0 |
| water | 74.5 |

The above colloidal zirconia was positively surface-charged and therefore showed a cationic property in water.

Liquid composition C showed a pH value of 3.1 and a zeta potential of +82 mV. After liquid composition C was straged, for testing purpose, in an ink tank at 60° C. for one month under dry condition, no deposit was found in the ink tank and stable ejection from a recording head was performed.

| Liquid Composition D: | |
|---|---|
| Ingredients | % by weight |
| glycerin | 7.5 |
| diethylene glycol | 7.5 |
| polyurethane microparticles | 10.0 |
| (trade name: Parmarin UC-20, mfd. by SANYO CHEMICAL INDUSTRIES, LTD., average particle diameter: 0.45 μm) | |
| stearyltrimethylammonium chloride | 0.1 |
| (trade name: Electrostripper QE, mfd. by Kao Corp., MW: 340) | |
| polyaminesulfon hydrochloride | 0.2 |
| (trade name: PAS-A-5, mfd. by NITTO BOSEKI CO., LTD., molecular weight ditribution having a peak at 3,500) | |
| acetic acid | 2.5 |
| water | 72.2 |

The above polyurethane microparticles had been subjected to surface cationic treatment and therefore showed a cationic property in water.

Liquid composition D showed a pH value of 5.2 and a zeta potential of +12 mV. After liquid composition D was straged, for testing purpose, in an ink tank at 60° C. for one month under dry condition, no deposit was found in the ink tank and stable ejection from a recording head was performed.

| Liquid Composition E: | |
|---|---|
| Ingredients | % by weight |
| glycerin | 7.5 |
| diethylene glycol | 7.5 |
| alumina hydrate | 10.0 |
| (average particle diameter: 0.17 μm) | |
| nitric acid | 0.2 |
| polyallylsulfon hydrochlorid | 0.5 |

-continued

| Liquid Composition E: | |
|---|---|
| Ingredients | % by weight |
| (trade name: PAS-A-1, mfd. by NITTO BOSEKI CO., LTD., MW: 2,000) | |
| benzalkonium chloride | 0.5 |
| (cation G50, infd. by SANYO CHEMICAL INDUSTRIES, LTD.) | |
| water | 73.8 |

The above alumina hydrate was obtained in the same manner as for Liquid Composition A. The alumina hydrate was positively surface-charged in water and therefore showed a cationic property.

Liquid composition E showed a pH value of 3.5 and a zeta potential of +39 mV. After liquid composition E was straged, for testing purpose, in an ink tank at 60° C. for one month under dry condition, no deposit was found in the ink tank and stable ejection from a recording head was performed.

| Liquid Composition F: | |
|---|---|
| Ingredients | % by weight |
| glycerin | 7.5 |
| diethylene glycol | 7.5 |
| alumina hydrate | 10.0 |
| (average particle diameter: 0.17 μm) | |
| nitric acid | 0.2 |
| polyallylsulfon hydrochloride | 0.5 |
| (trade name: PAS-A-1, mfd. by NITTO BOSEKI CO., LTD., MW: 2,000) | |
| triethylene tetramine hydrochloride ($H_2N(CH_2CH_2NH)_3H$) | 0.5 |
| water | 73.8 |

The above alumina hydrate was obtained in the same manner as for Liquid Composition A.

Liquid composition F showed a pH value of 3.8 and a zeta potential of +39 mV. After liquid composition F was straged, for testing purpose, in an ink tank at 60° C. for one month under dry condition, no deposit was found in the ink tank and stable ejection from a recording head was performed.

| Liquid Composition G: | |
|---|---|
| Ingredients | % by weight |
| glycerin | 7.5 |
| diethylene glycol | 7.5 |
| polyallylamine acetate | 0.5 |
| (synthesized, MW: 2,000) | |
| nitric acid | 0.2 |
| polyurethane microparticles | 10.0 |
| (trade name: Parmarin UC-20, mfd. by SANYO CHEMICAL INDUSTRIES, LTD., average particle diameter: 0.45 μm) | |
| benzalkonium chloride | 0.5 |
| water | 73.8 |

The above polyurethane microparticles had been subjected to surface cationic treatment and therefore showed a cationic property in water.

Liquid composition G showed a pH value of 4.8 and a zeta potential of +12 mV. After liquid composition G was straged, for testing purpose, in an ink tank at 60° C. for one month under dry condition, no deposit was found in the ink tank and stable ejection from a recording head was performed.

| Liquid Composition H: | |
|---|---|
| Ingredients | % by weight |
| glycerin | 7.5 |
| diethylene glycol | 7.5 |
| polyallylamine acetate (synthesized, MW: 2,000) | 0.5 |
| nitric acid | 0.2 |
| polyurethane microparticles (trade name: Parmarin UC-20, mfd. by SANYO CHEMICAL INDUSTRIES, LTD., average particle diameter: 0.45 μm) | 10.0 |
| triethylene tetramine hydrochloride ($H_2N(CH_2CH_2NH)_3H$) | 0.5 |
| water | 73.8 |

The above polyurethane microparticles had been subjected to surface cationic treatment and therefore showed a cationic property in water.

Liquid composition H showed a pH value of 4.7 and a zeta potential of +12 mV. After liquid composition H was straged, for testing purpose, in an ink tank at 60° C. for one month under dry condition, no deposit was found in the ink tank and stable ejection from a recording head was performed.

| Liquid Composition I: | |
|---|---|
| Ingredients | % by weight |
| glycerin | 7.5 |
| diethylene glycol | 7.5 |
| alumina hydrate (average particle diameter: 0.17 μm) | 10.0 |
| zirconium oxynitrate dihydrate | 0.4 |
| water | 74.6 |

The above alumina hydrate was obtained in the same manner as for Liquid Composition A. The alumina hydrate was positively surface-charged in water and therefore showed a cationic property.

A 1% aqueous solution of the above zirconium oxynitrate dihydrate showed a pH value of 2.7.

Liquid composition I showed a pH value of 3.8 and a zeta potential of +42 mV. After liquid composition I was straged, for testing purpose, in an ink tank at 60° C. and 5° C. for one month under dry condition, it formed no deposit in the ink tank nor showed any thickening and showed stable ejection from a recording head.

| Liquid Composition J: | |
|---|---|
| Ingredients | % by weight |
| glycerin | 7.5 |
| diethylene glycol | 7.5 |
| colloidal silica (trade name: Snowtex AK, mfd. by Nissan Chemical Industries, Ltd., average particle diameter: 0.02 μm) | 10.0 |

| -continued | |
|---|---|
| Liquid Composition J: | |
| Ingredients | % by weight |
| polyaluminum chloride (15% aqueous solution, trade name: Paho #2S, mfd. by Asada Kagaku Kogyo KK) | 2.0 |
| water | 73.0 |

The above colloidal silica had been subjected to surface cationic treatment and therefore showed a cationic property in water.

A 1% aqueous solution of the above polyaluminum chloride showed a pH value of 4.3.

Liquid composition J showed a pH value of 3.9 and a zeta potential of +71 mV. After liquid composition J was straged, for testing purpose, in an ink tank at 60° C. and 5° C. for one month under dry condition, it formed no deposit in the ink tank nor showed any thickening and showed stable ejection from a recording head.

| Liquid Composition K: | |
|---|---|
| Ingredients | % by weight |
| glycerin | 7.5 |
| diethylene glycol | 7.5 |
| colloidal zirconia (trade name: $ZrO_2$ Sol, mfd. by Daiichi Kigenso Kagaku Kogyo KK, average particle diameter: 0.10 μm) | 10.0 |
| zirconium oxyacetate | 0.5 |
| nitric acid | 0.2 |
| water | 74.3 |

The above colloidal zirconia was positively surface-charged and therefore showed a cationic property in water.

A 1% aqueous solution of the above zirconium oxyacetate showed a pH value of 3.5.

Liquid composition K showed a pH value of 3.4 and a zeta potential of +78 mV. After liquid composition K was straged, for testing purpose, in an ink tank at 60° C. and 5° C. for one month under dry condition, it formed no deposite in the ink tank nor showed any thickening and showed stable ejection from a recording head.

| Liquid Composition L: | |
|---|---|
| Ingredients | % by weight |
| glycerin | 7.5 |
| diethylene glycol | 7.5 |
| alumina hydrate (average particle diameter: 0.17 μm) | 10.0 |
| zirconium oxynitrate dihydrate | 0.4 |
| benzalkonium chloride (50% aqueous solution) | 0.4 |
| water | 74.2 |

The above alumina hydrate was obtained in the same manner as for Liquid Composition A. The alumina hydrate was positively surface-charged in water and therefore showed a cationic property.

A 1% aqueous solution of the above zirconium oxynitrate dihydrate showed a pH value of 2.7.

Liquid composition L showed a pH value of 3.8 and a zeta potential of +45 mV. After liquid composition L was straged, for testing purpose, in an ink tank at 60° C. and 5° C. for one month under dry condition, it formed no deposite in the ink tank nor showed any thickening and showed stable ejection from a recording head.

Ink subset 1 used in the examples was prepared as described below. Ingredients for each dye ink of subset 1 were combined to be mixed together and then passed under pressure through a membrane filter having a pore size of 0.45 μm (trade name: Fluoropore Filter, mfd. by Sumitomo Electric Industries, Ltd.) to obtain ink subset 1 including black ink Bk1, yellow ink Y1, magenta ink M1 and cyan ink C1.

| Ingredients | % by weight |
|---|---|
| Black ink Bk1: | |
| CI Direct Black 195 | 2.5 |
| 2-pyrrolidone | 10.0 |
| glycerin | 5.0 |
| isopropyl alcohol | 4.0 |
| sodium hydroxide | 0.4 |
| water | 78.1 |
| Yellow ink Y1: | |
| Projet Fast Yellow 2 | 2.0 |
| (mfd. by Zeneca Co.) | |
| CI Direct Yellow 86 | 1.0 |
| thiodiglycol | 8.0 |
| ethylene glycol | 8.0 |
| Acetylenol EH | 0.2 |
| (mfd. by Kawaken Chemicals KK) | |
| isopropyl alcohol | 4.0 |
| water | 76.8 |
| Magenta ink M1: | |
| Projet Fast Magenta 2 | 3.0 |
| (mfd. by Zeneca Co.) | |
| glycerin | 7.0 |
| urea | 7.0 |
| Acetylenol EH | 0.2 |
| (mfd. by Kawaken Chemicals KK) | |
| isopropyl alcohol | 4.0 |
| water | 78.8 |
| Cyan ink C1: | |
| CI Direct Blue 199 | 3.0 |
| ethylene glycol | 7.0 |
| diethylene glycol | 10.0 |
| Acetylenol EH | 0.2 |
| (mfd. by Kawaken Chemicals KK) | |
| water | 79.7 |

Ink subset 2 used in the examples was prepared as described below. Ingredients for each pigment ink of subset 2 were combined to be mixed together and then passed under pressure through a membrane filter having a pore size of 0.45 μm (trade name: Fluoropore Filter, mfd. by Sumitomo Electric Industries, Ltd.) to obtain ink subset 2 including black ink Bk2, yellow ink Y2, magenta ink M2 and cyan ink C2.

| Ingredients | % by weight |
|---|---|
| Black ink Bk2: | |
| liquid dispersion of pigment | 30.0 |
| glycerin | 10.0 |
| ethylene glycol | 5.0 |
| N-methyl pyrrolidone | 5.0 |

| Ingredients | % by weight |
|---|---|
| Black ink Bk2 (-continued): | |
| ethyl alcohol | 2.0 |
| deionized water | 48.0 |

The above liquid dispersion of pigment was prepared as follows. Initially, styrene-acrylic acid-ethyl acrylate copolymer (S-AA-EA copolymer), monoethanol amine, diethylene glycol and deionized water were mixed at the following ratio (expressed as % by weight):

| | |
|---|---|
| S-AA-EA copolymer | 1.5 |
| (acid value: 140, weight average molecular weight: 5,000) | |
| monoethanol amine | 1.0 |
| diethylene glycol | 5.0 |
| deionized water | 81.5 |

Then, the mixture was heated at 70° C. to completely melt the resin component. To the resulting solution were added 10 parts of carbon black (MCF 88, newly prepared by Mitsubishi Chemical Corp.) and 1 part of isopropyl alcohol, followed by premixing for 30 minutes. The premixed formulation was subjected to dispersion treatment under the following conditions:

| | |
|---|---|
| dispersing machine: | sand grinder (mfd. by Igarashi Kikai KK) |
| grinding medium: | zirconium beads (diameter: 1 mm) |
| filling rate: | 50% (by volume) |
| grinding time: | 3 hours |

Finally, large particles were removed by centrifugal separation (12,000 r.p.m., 20 minutes) to obtain the liquid dispersion of pigment.

Yellow Ink Y2

The same process steps were carried out as in the preparation of Black ink Bk2 except that Pigment Yellow 74 was used in place of the carbon black.

Magenta Ink M2

The same process steps were carried out as in the preparation of Black ink Bk2 except that Pigment Red 7 was used in place of the carbon black.

Cyan Ink C2

The same process steps were carried out as in the preparation of Black ink Bk2 except that Pigment Blue 15 was used in place of the carbon black.

Examples 1 Through 8

Recording was carried out on sheets of plain paper (trade name: Canon OfficeMulti, hereinafter referred to as "KG paper") by using liquid composition A, B or C and ink subset 1 (Bk1, Y1, M1 and C1) or 2 (Bk2, Y2, M2 and C2) in combination to obtain images of EXAMPLES 1 through 8. In these examples, an ink jet recording apparatus as shown in FIG. 4 and five recording heads as shown in FIG. 8 were used. Liquid compositions were firstly applied onto sheets of paper and subsequently, inks were applied.

Specifically, a printing area was scanned three times for printing, i.e. three-pass fine printing mode being employed. In each pass, the liquid composition was applied to pixel positions to which any of the yellow, magenta, cyan and black inks was to be applied. In other words, logical sum of printing data for yellow, magenta, cyan and black in each pass was used as printing data for the liquid composition. Various fine masks known in the art can be used without any particular limitations for fine printing and therefore, specific description of those masks are omitted here.

The recording heads used in these examples had a recording density of 600 dpi and were driven at a driving frequency of 9.6 kHz. Ejection amounts per one dot were 15 ng for the yellow, magenta and cyan inks while 30 ng for the black ink.

TABLE 1

| EXAMPLE | Ink Subset | Liquid Composition |
|---|---|---|
| 1 | 1 | A |
| 2 | 1 | B |
| 3 | 1 | C |
| 4 | 1 | D |
| 5 | 2 | A |
| 6 | 2 | B |
| 7 | 2 | C |
| 8 | 2 | D |

Comparative Examples 1 and 2

Recording was carried out by using ink subsets 1 and 2 in COMPARATIVE EXAMPLES 1 and 2, respectively. The recording heads used in these comparative examples had a recording density of 600 dpi and were driven at a driving frequency of 9.6 kHz. Ejection amounts per one dot were 15 ng for the yellow, magenta and cyan inks while 30 ng for the black ink. Thus, recording was carried out on sheets of paper of the same kind under the same conditions as in EXAMPLES 1 through 8.

Evaluation of Recorded Images

Recorded images obtained in EXAMPLES 1 through 8 and COMPARATIVE EXAMPLES 1 and 2 were evaluated in accordance with the following methods and standards. The results of evaluation are listed in TABLE 2 below.

(1) Coloring Property

The RGB color chart of Standard High Precision Picture data (SHIPP, including XYZ/CIELAB/RGB digital color chart data, supervised by the Committee for Preparation of Standard High Precision Images, issued by the Institute of Image Electronics Engineers of Japan) was printed by using a printer and the printed image was subjected to calorimetric measurement. Coloring property was evaluated by calculating the three-dimensional breadth of color distribution (hereinafter referred to as "color gamut volume") in accordance with the method described in the technical manual of SHIPP and comparing those values. Printed images were obtained under the same image processing conditions and the calorimetric measurement was conducted when 24 hours had passed after printing by means of a GRETAG Spectrolino spectrophotometer provided with light source D50 at a field of view of 2°. The ratio of color gamut volume with reference to the same in the case of printing using only the ink subset was adopted as a parameter for evaluation and was classified into four levels as follows:

| Level | Color Gamut Volume Ratio |
|---|---|
| AA: | not less than 1.4 |
| A: | not less than 1.2 but less than 1.4 |
| B: | not less than 1.0 but less than 1.2 |
| C: | less than 1.0 |

Meanwhile, printing was carried out by using ink subset 1 on a sheet of coated paper for ink jet printing (trade name: Color BJ Paper LC-101, supplied by Canon Inc). In that case, the ratio of color gamut volume with reference to the same of the printed matter of COMPARATIVE EXAMPLE 1 was 1.3.

(2) Bleeding

Solid images in each color of the yellow, magenta, cyan and black inks were printed adjacent to each other and the degree of bleeding was evaluated by visual observation at the borders of two colors. Evaluation was based on the degree of bleeding at the border where the severest bleeding was observed. Criteria for evaluation were as follows:

| Level | Degree of Bleeding |
|---|---|
| A: | substantially no bleeding |
| B: | slight bleeding but practically tolerable |
| C: | other than levels A and B |

(3) Evenness

Solid images in each color of the yellow, magenta, cyan and black inks were printed and the color evenness was evaluated by visual observation with respect to white haze and color unevenness. Evaluation was based on the color showing the most significant unevenness.

Criteria for evaluation were as follows:

| Level | White Haze and Color Unevenness |
|---|---|
| A: | substantially not observed |
| B: | slightly observed along paper fibers but practically tolerable |
| C: | remarkably observed along paper fibers |

(4) Stripy Unevenness

Solid images in each color of the yellow, magenta, cyan and black inks were printed and the stripy unevenness was evaluated by visual evaluation. Evaluation was based on the color showing the most significant stripy unevenness. Criteria for evaluation were as follows:

| Level | Stripy Unevenness |
|---|---|
| A: | substantially not observed |
| B: | slightly observed as pattern of each head-scan but practically tolerable |
| C: | remarkably observed as pattern of each head-scan |

(5) Rub-off Resistance

Solid images in each color of the yellow, magenta, cyan and black inks were printed. When 16 hours had passed after printing, a sheet of silbon paper was placed on the printed area and further thereon, a weight of 3.5 cm×3.5 cm was placed to apply a pressure of 40 g/cm². Under this condition, the silbon paper was pulled out at a moving rate of 15 cm/sec to evaluate the rub-off resistance of the printed image. Evaluation was based on the color showing the smallest rub-off resistance. Criteria for evaluation were as follows:

| Level | Ink Adhesion to Silbon Paper |
|---|---|
| A: | substantially not observed |
| B: | slightly observed but color rub-off of the printed image is not remarkable) |
| C: | significantly observed and color rub-off of the printed image is remarkable) |

(6) Texture

Solid images in each color of the yellow, magenta, cyan and black inks were printed and the texture of the recording medium was evaluated by visual evaluation. Criteria for evaluation were as follows:

| Level | Texture of Printed and Unprinted Areas |
|---|---|
| A: | same as plain paper in both areas |
| B: | entirely different from plain paper or different between printed and unprinted areas |

TABLE 2

| | Evaluation | | | | | |
|---|---|---|---|---|---|---|
| Example | (1) | (2) | (3) | (4) | (5) | (6) |
| 1 | AA | B | A | A | A | A |
| 2 | A | A | A | A | A | A |
| 3 | A | A | A | A | A | A |
| 4 | A | B | A | A | A | A |
| 5 | AA | B | A | A | A | A |
| 6 | A | A | A | A | A | A |
| 7 | A | A | A | A | A | A |
| 8 | A | B | A | A | A | A |
| Comp. 1 | B | C | C | A | A | A |
| Comp. 2 | B | B | C | A | C | A |

Evaluation
(1) Coloring property
(2) Bleeding
(3) Evenness
(4) Stripy unevenness
(5) Rub-off resistance
(6) Texture Examples 9 through 16

Ink sets of EXAMPLES 9 to 16 were prepared by using liquid compositions E, F, G and H and color inks of ink subset 1 (Bk1, Y1, M1 and C1) or ink subset 2 (Bk2, Y2, M2 and C2) in combination, as shown in TABLE 3 below. Printing was carried out by using these ink sets.

TABLE 3

| EXAMPLE | Ink Subset | Liquid Composition |
|---|---|---|
| 9 | 1 | E |
| 10 | 1 | F |
| 11 | 1 | G |
| 12 | 1 | H |
| 13 | 2 | E |

TABLE 3-continued

| EXAMPLE | Ink Subset | Liquid Composition |
|---|---|---|
| 14 | 2 | F |
| 15 | 2 | G |
| 16 | 2 | H |

Ink subset
1: dye type
2: pigment type

| | | Liquid composition | | |
|---|---|---|---|---|
| | pH | Zeta potential (mV) | Fine particle | Cationic compound | Acid |
| E: | 3.5 | +39 | alumina hydrate | polyallylsulfon hydrochloride (Mw = 2000) benzalkonium chloride | $HNO_3$ |
| F: | 3.8 | +39 | alumina hydrate | polyallylsulfon hydrochloride (Mw = 2000) triethylene tetramine | $HNO_3$ |
| G: | 4.8 | +12 | poly-urethane | polyallylamine acetate benzalkonium chloride | $HNO_3$ |
| H: | 4.7 | +12 | poly-urethane | polyallylamine acetate triethylene tetramine | $HNO_3$ |

Also in EXAMPLES 9 to 16 using liquid compositions E–H and ink subsets 1 and 2 in various combinations as shown in Table 3, recording was carried out on sheets of plain paper of the following seven types:

1) PB Paper supplied by Canon Inc
2) Brilliant White Paper supplied by Canon Inc
3) Great White Inkjet supplied by Union Camp Co.
4) Jet Print supplied by Hammermill Co.
5) Xerox 4024 supplied by Xerox Co.
6) Bright White Inkjet Paper suppied by Hewlett Packard Co.
7) Ray Jet supplied by Aussdat Ray Co.

In these examples, an ink jet recording apparatus as shown in FIG. 4 and five recording heads as shown in FIG. 8 were used. Liquid compositions were firstly applied onto sheets of paper and subsequently, inks were applied.

Results of evaluation of images obtained in EXAMPLES 9 to 16 are listed in Table 4 below. The same methods and criteria of evaluation as described above were employed except for bleeding and water resistance, for which evaluation was conducted in accordance with the methods and criteria described below. Table 4 shows the average results of the seven types of paper in the case where similar results were obtained among them, while it shows the worst results when results varied among them.

Bleeding

Solid images in second color resulting from the combination of two colors selected from the yellow, magenta and cyan inks and solid images in black formed by using the black ink were printed adjacent to each other and the degree of bleeding was evaluated by visual observation at the borders between the solid images in second color and the solid images in black. Criteria for evaluation were as follows:

| Level | Degree of Bleeding |
|-------|--------------------|
| A: | substantially no bleeding at any border of images |
| B: | bleeding observed in some types of paper |
| C: | bleeding observed in substantially all types of paper |

Water Resistance

Solid images in each color of the yellow, magenta, cyan and black inks were printed and allowed to stand for 24 hours. Optical density was measured for each solid image by means of a Macbeth optical density meter. Then, the sheets of paper bearing the printed images were dipped in still water for 5 minutes before taken out therefrom and allowed to stand for 24 hours. Again, optical density was measured for each image after dipping in still water. Criteria for evaluation were as follows:

| Level | Optical Density After Dipping |
|-------|-------------------------------|
| A: | not less than 90% of O.D. before dipping |
| B: | not less than 80% and less than 90% of O.D. before dipping |
| C: | less than 80% of O.D. before dipping |

TABLE 4

| | Evaluation | | | | | | |
|---|---|---|---|---|---|---|---|
| Example | (a) | (b) | (c) | (d) | (e) | (f) | (g) |
| 9 | AA | A | A | A | A | A | A |
| 10 | AA | A | A | A | A | A | A |
| 11 | A | A | A | A | A | A | A |
| 12 | A | A | A | A | A | A | A |
| 13 | AA | A | A | A | A | A | A |
| 14 | AA | A | A | A | A | A | A |
| 15 | A | A | A | A | A | A | A |
| 16 | A | A | A | A | A | A | A |

Evaluation
(a) Coloring property
(b) Evenness
(c) Stripy unevenness
(d) Rub-off resistance
(e) Texture
(f) Bleeding
(g) Water resistance Examples 17 through 24

Images were recorded in the same manner as in EXAMPLES 1 to 8 by using liquid composition I, J, K or L and ink subset 1 or 2 in combination as shown in Table 5 below. The recorded images were evaluated in accordance with the same methods and criteria as in EXAMPLES 1 to 8. Results of evaluation are listed in Table 6 below.

TABLE 5

| EXAMPLE | Ink Subset | Liquid Composition |
|---------|------------|--------------------|
| 17 | 1 | I |
| 18 | 1 | J |
| 19 | 1 | K |
| 20 | 1 | L |
| 21 | 2 | I |
| 22 | 2 | J |
| 23 | 2 | K |
| 24 | 2 | L |

TABLE 6

| | Evaluation | | | | | | |
|---|---|---|---|---|---|---|---|
| Example | (a) | (b) | (c) | (d) | (e) | (f) | (g) |
| 17 | AA | A | A | A | A | A | A |
| 18 | A | A | A | A | A | A | A |
| 19 | A | A | A | A | A | A | A |
| 20 | AA | A | A | A | A | A | A |
| 21 | AA | A | A | A | A | A | A |
| 22 | A | A | A | A | A | A | A |
| 23 | A | A | A | A | A | A | A |
| 24 | AA | A | A | A | A | A | A |

Evaluation
(a) Coloring property
(b) Evenness
(c) Stripy unevenness
(d) Rub-off resistance
(e) Texture
(f) Bleeding
(g) Water resistance

What is claimed is:

1. A liquid composition containing a first cationic substance and a second cationic substance different from said first cationic substance, said first cationic substance being in the form of micro-particles, said micro-particles being cationic at least at the surface thereof.

2. A liquid composition to be used with an anionic aqueous ink containing a coloring material so as to react with the ink on a recording medium for printing on the recording medium, said liquid composition containing a first cationic substance and a second cationic substance different from said first cationic substance, said first cationic substance being in the form of micro-particles, said micro-particles being cationic at least at the surface thereof.

3. A liquid composition according to claim 1 or 2, wherein said composition exhibits a zeta potential between +5 and +90 mV attributable to at least one type of cationic micro-particles.

4. A liquid composition according to claim 1 or 2, further containing an acid;
   said composition showing a pH value regulated to between 2 and 7.

5. A liquid composition according to claim 4, wherein the primary dissociation constant pKa of the acid is not more than 5 in water.

6. A liquid composition according to claim 1 or 2, wherein the average particle diameter of the cationic micro-particles is between 0.005 and 1 $\mu$m.

7. A liquid composition according to claim 1 or 2, wherein said second cationic substance comprises a cationic polymer.

8. A liquid composition according to claim 7, wherein said second cationic substance shows a molecular weight between 400 and 10,000 attributable to said cationic polymer when observed by gel permeation chromatography.

9. A liquid composition according to claim 1 or 2, wherein
said second cationic substance comprises at least two different compounds.

10. A liquid composition according to claim 9, wherein
at least one of the compounds of said second cationic substance is a surface active agent.

11. A liquid composition according to claim 9, wherein
said second cationic substance comprises at least a compound having a molecular weight not greater than 500 and another compound having a molecular weight greater than 500.

12. A liquid composition according to claim 1 or 2, wherein
the ratio by weight of said first cationic substance to said second cationic substance is between 1:1 and 100:1.

13. A liquid composition according to claim 1 or 2, wherein
said second cationic substance comprises a water-soluble cationic metal salt.

14. A liquid composition according to claim 13, wherein
a 1% aqueous solution of said water-soluble metal salt is acidic.

15. A liquid composition according to claim 13, wherein
the ratio by weight of said first cationic substance to said second cationic substance is between 10:1 and 1,000:1.

16. A liquid composition according to claim 1 or 2, wherein
the total amount of said first cationic substance and said second cationic substance is between 0.05 and 20 weight % relative to the total mass of the ink.

17. An ink set comprising in combination a liquid composition according to claim 1 or 2 and at least an anionic ink selected from a group of inks of yellow, magenta, cyan, black, red, blue and green.

18. An ink set according to claim 17, wherein
said group of inks is a combination of inks of three colors of yellow, magenta and cyan.

19. An ink set according to claim 17, wherein
said group of inks is a combination of inks of four colors of yellow, magenta, cyan and black.

20. An ink set according to claim 17, wherein
said ink contains an anionic coloring material.

21. An ink set according to claim 17, wherein
said ink contains a water-soluble dye having anionic radicals.

22. An ink set according to claim 17, wherein
said ink contains a pigment having anionic radicals on the surface.

23. An ink set according to claim 17, wherein
said ink contains a pigment and an anionic compound.

24. An image forming method comprising a step of applying a liquid composition according to claim 1 or 2 and an ink containing an anionic coloring material to a recording medium so as to make them contact with each other on the recording medium.

25. An image forming method according to claim 24, wherein
said step comprises steps of applying the liquid composition to the recording medium and subsequently applying the ink so as to contact with the liquid composition.

26. An image forming method according to claim 24, wherein
said step comprises steps of applying the ink to the recording medium and subsequently applying the liquid composition so as to contact with the ink.

27. An image forming method according to claim 24, wherein
said step comprises steps of applying the ink, the liquid composition and the ink to the recording medium in the mentioned order so as to make them contact with each other.

28. An image forming method according to claim 24, wherein
the liquid composition is applied to the recording medium by means of an ink-jet recording method adapted to cause the liquid composition to be ejected from an orifice according to a recording signal.

29. An image forming method according to claim 28, wherein
said ink-jet recording method is a method of causing thermal energy to act on the liquid composition so as to make liquid droplets of the liquid composition to be ejected.

30. An image forming method according to claim 24, wherein
the ink is applied to the recording medium by means of an ink-jet recording method adapted to cause the ink to be ejected from an orifice according to a recording signal.

31. An image forming method according to claim 30, wherein
said ink-jet recording method is a method of causing thermal energy to act on the ink so as to make ink droplets to be ejected.

32. An image recording apparatus provided with a recording unit comprising an ink storage section for storing separately a liquid composition according to claim 1 or 2 and an ink of at least one color containing an anionic substance and a head section for separately ejecting said liquid composition and said ink as liquid droplets.

33. An image recording apparatus according to claim 32, wherein
said head section comprises a head adapted to cause thermal energy to act on the ink so as to make droplets of ink to be ejected.

34. A liquid composition adapted to form colored sections on a recording medium when applied to the recording medium with an ink containing an anionic or cationic coloring material;
said liquid composition containing a first compound showing the polarity opposite to that of said ink and a second compound also showing the polarity opposite to that of said ink;
said first compound being in the form of micro-particles;
the coloring material in said ink being adapted to be adsorbed or bound to the surface of the micro-particles while its molecular state being substantially equivalent to that in the ink at the time of mixing said liquid composition and said ink in a liquid state so as to make the dispersion of said micro-particles unstable and said micro-particles coagulate with each other.

35. An ink set comprising as independent components thereof an ink containing an anionic or cationic coloring material and a liquid composition containing micro-particles electrically charged to the polarity opposite to that of said coloring material;
said liquid composition containing a first compound showing the polarity opposite to that of said ink and a second compound also showing the polarity opposite to that of said ink;
the coloring material in said ink being adapted to be adsorbed or bound to the surface of the micro-particles while its molecular state being substantially equivalent to that in the ink at the time of mixing said liquid composition and said ink in a liquid state so as to make the dispersion of said micro-particles unstable and said micro-particles coagulate with each other.

36. An image forming method comprising a step of causing an ink containing a coloring material and a liquid composition containing a first compound in the form of micro-particles reactive to said coloring material and a second compound also reactive to said coloring material to react with each other as liquid-liquid reaction on a recording medium and forming colored sections containing said coloring material and said first and second compounds;

said step including a step of causing said coloring material in said ink to be adsorbed or bound to the surface of the micro-particles in said liquid composition, while maintaining the molecular state of said coloring material in said ink.

37. An image forming method comprising a step of causing an ink containing a coloring material and a liquid composition containing a first compound in the form of micro-particles reactive to said coloring material and a second compound also reactive to said coloring material to react with each other as liquid-liquid reaction on a recording medium and forming colored sections containing said coloring material and said first and second compounds;

said step including:

a step of causing said coloring material in said ink to be adsorbed or bound to the surface of the micro-particles in said liquid composition, while maintaining the molecular state of said coloring material in said ink; and a step of causing said coloring material in said ink to react with said second compound in said liquid composition.

38. An image forming method comprising a step of causing an ink containing a coloring material and a liquid composition containing a first compound in the form of micro-particles reactive to said coloring material and a second compound also reactive to said coloring material to react with each other as liquid-liquid reaction on a recording medium and forming colored sections containing said coloring material and said first and second compounds;

said step including:

a step of causing said coloring material in said ink to be adsorbed or bound to the surface of the micro-particles in said liquid composition, while maintaining the molecular state of said coloring material in said ink;

a step of causing said micro-particles to become less dispersed and coagulate as a result of adsorbing or binding said coloring material to the surface thereof; and a step of causing said coloring material in said ink to react with said second compound in said liquid composition.

39. An image forming method comprising a step of causing an ink containing a coloring material and a liquid composition containing a first compound in the form of micro-particles reactive to said coloring material and a second compound also reactive to said coloring material to react with each other as liquid-liquid reaction on a recording medium and forming colored sections containing said coloring material and said first and second compounds;

said step including:

a step of causing said coloring material in said ink to be adsorbed or bound to the surface of the micro-particles in said liquid composition, while maintaining the molecular state of said coloring material in said ink;

a step of causing said micro-particles to become less dispersed and coagulate as a result of adsorbing or binding said coloring material to the surface thereof; and a step of causing the part of said coloring material not participating in the reaction with said micro-particles in said liquid composition to react with said second compound in said liquid composition.

40. An image formed by causing an ink containing a coloring material and a liquid composition containing a first compound in the form of micro-particles reactive to said coloring material and a second compound also reactive to said coloring material to react with each other as liquid-liquid reaction on a recording medium, said image containing colored sections therein;

said colored sections containing said coloring material of said ink in a state of being adsorbed or bound to said micro-particles of said liquid composition as single molecules and in a state of having reacted with said second compound of said liquid composition.

41. A method of alleviating bleeding appearing along the boundary lines of first areas of a color and second areas of another color located respectively adjacent to said first areas in an image formed by applying liquid droplets to a recording medium;

at least either said first areas or second areas being colored sections formed by causing ink containing a coloring material and a liquid composition containing a first compound in the form of micro-particles reactive to said coloring material and a second compound also reactive to said coloring material to react with each other as liquid-liquid reaction on a recording medium, said colored sections containing therein said coloring material of said ink in a state of being adsorbed or bound to said micro-particles of said liquid composition as single molecules and in a state of having reacted with said second compound of said liquid composition.

* * * * *

UNITED STATES PATENT AND TRADEMARK OFFICE
CERTIFICATE OF CORRECTION

PATENT NO.    : 6,536,890 B1
DATED         : March 25, 2003
INVENTOR(S)   : Masao Kato et al.

It is certified that error appears in the above-identified patent and that said Letters Patent is hereby corrected as shown below:

Column 12,
Line 22, "got to" should read -- gotten --.
Line 27, "permeantes." should read -- permeates. --.

Column 16,
Line 23, "to by" should read -- and in --.
Line 24, "turn" should read -- turn to --.
Line 39, "from" should read -- form --.
Line 64, "acid trichloroacetic" should read -- acid, trichloroacetic --.

Column 17,
Line 54, "coexists" should read -- coexist --.

Column 20,
Lines 5 and 9, "$(CH_3)_2)$" should read -- $(CH_3)_2)$, --.

Column 23,
Line 23, "Columnbia)," should read -- Columbia), --.
Line 24, "form" should read -- from --.

Column 24,
Line 3, "advantages" should read -- advantageous --.
Line 8, "an" should read -- a --.
Line 39, "is bound" should be deleted.

Column 28,
Lines 43 and 44, "a ink" should read -- an ink --.

UNITED STATES PATENT AND TRADEMARK OFFICE
CERTIFICATE OF CORRECTION

PATENT NO. : 6,536,890 B1
DATED : March 25, 2003
INVENTOR(S) : Masao Kato et al.

It is certified that error appears in the above-identified patent and that said Letters Patent is hereby corrected as shown below:

Column 36,
Line 43, "deposite" should read -- deposit --.

Column 37,
Line 2, "deposite" should read -- deposit --.

Column 42,
Line 45, "suppied" should read -- supplied --.

Signed and Sealed this

Eleventh Day of November, 2003

JAMES E. ROGAN
*Director of the United States Patent and Trademark Office*